(12) United States Patent
Millenaar et al.

(10) Patent No.: US 12,484,545 B2
(45) Date of Patent: Dec. 2, 2025

(54) SOLANUM LYCOPERSICUM PLANTS HAVING IMPROVED TOBAMOVIRUS RESISTANCE

(71) Applicant: Nunhems B.V., Nunhem (NL)

(72) Inventors: Frank Millenaar, Nunhem (NL); Pernelle Vredenbregt, Nunhem (NL); Jochem Altena, Nunhem (NL); Marco Antonio Mammella, Sant Agata Bolognese (IT); Henk Verbakel, Nunhem (NL)

(73) Assignee: Nunhems B.V., Nunhem (NL)

( * ) Notice: Subject to any disclaimer, the term of this patent is extended or adjusted under 35 U.S.C. 154(b) by 260 days.

(21) Appl. No.: 17/920,326

(22) PCT Filed: Apr. 15, 2021

(86) PCT No.: PCT/EP2021/059814
§ 371 (c)(1),
(2) Date: Oct. 20, 2022

(87) PCT Pub. No.: WO2021/213892
PCT Pub. Date: Oct. 28, 2021

(65) Prior Publication Data
US 2024/0292805 A1    Sep. 5, 2024

(30) Foreign Application Priority Data

Apr. 23, 2020 (EP) ..................................... 20171136

(51) Int. Cl.
| | | |
|---|---|---|
| *A01H 5/10* | (2018.01) | |
| *A01H 1/00* | (2006.01) | |
| *A01H 6/82* | (2018.01) | |
| *C07K 14/415* | (2006.01) | |

(52) U.S. Cl.
CPC ............. *A01H 6/825* (2018.05); *A01H 1/126* (2021.01); *A01H 5/10* (2013.01); *C07K 14/415* (2013.01)

(58) Field of Classification Search
None
See application file for complete search history.

(56) References Cited

U.S. PATENT DOCUMENTS

2020/0077614 A1    3/2020  Ashkenazi et al.

FOREIGN PATENT DOCUMENTS

| EP | 0534858 A1 | 3/1993 |
|---|---|---|
| WO | 2017/012951 A1 | 1/2017 |
| WO | 2018/219941 A1 | 12/2018 |
| WO | 2019/110130 A1 | 6/2019 |
| WO | 2020/018783 A1 | 1/2020 |

OTHER PUBLICATIONS

Zinger et al, 2021, Plants, 10:1-16.*
Ishibashi et al, 2012, PLOS Pathogens, 8:1-12.*
"Detection of Infectious Tomato brown rugose fruit virus (ToBRFV) in Tomato and Pepper Seed", International Seed Federation, Version 1.4, Mar. 2020, 11 pages.
"Genus: *Tobamovirus*", Positive-Sense RNA Viruses—Virgaviridae, International Committee on Taxonomy of Viruses (ICTV) Reports, Feb. 8, 2021, 6 pages.
"Solanum habrochaites Tm-1PI390659b mRNA for Tm-1 protein, complete cds.", Database EMBL [Online], retrieved from database accession No. AB713175, XP002803425, Nov. 4, 2012, 2 pages.
"Tobacco mosaic virus strain Ohio V, complete genome, genomic RNA", GenBank, Database accession No. FR878069.1, Jan. 10, 2012, 3 pages.
Allen, et al., "Transcript-specific, single-nucleotide polymorphism discovery and linkage analysis in hexaploid bread wheat (*Triticum aestivum* L.)", Plant biotechnology journal, vol. 9, Issue 9, Jun. 1, 2011, pp. 1086-1099.
Antonio Tiezzi, "The pollen tube cytoskeleton", Electron Microscopy Reviews, vol. 4, Issue 2, 1991, pp. 205-219.
Henikoff, et al., "Amino acid substitution matrices from protein blocks", Proceedings of the National Academy of Sciences, vol. 89, Issue 22, Nov. 15, 1992, pp. 10915-10919.

(Continued)

*Primary Examiner* — Jason Deveau Rosen
(74) *Attorney, Agent, or Firm* — ArentFox Schiff LLP

(57) ABSTRACT

The present invention relates to a hybrid *Solanum lycopersicum* plant comprising in its genome at least one copy of the Rug-1 resistance gene, wherein said Rug-1 resistance gene is capable of conferring a Tomato Brown Rugose Fruit Virus (ToBRFV) tolerance/resistance phenotype. The present invention further relates to a seed produced by the plant according to the present invention, a seed from which a plant according to present invention can be grown, a fruit produced by a plant according to the present invention and a part of a plant according to the present invention. The present invention further relates to a method of identifying and/or selecting a plant or plant part according to the present invention. The present invention further relates to a method for producing a *Solanum lycopersicum* plant having a ToBRFV tolerance/resistance phenotype according to the present invention. The present invention further relates to a method for enhancing the ToBRFV tolerance/resistance phenotype of a *Solanum lycopersicum* plant, the use of the Rug-1 resistance gene according to the present invention for enhancing the ToBRFV tolerance/resistance phenotype in a *Solanum lycopersicum* plant and the use of a genetic marker specific of the Rug-1 resistance gene according to the present invention for selecting a *Solanum lycopersicum* plant having an enhanced ToBRFV tolerance/resistance phenotype.

14 Claims, 7 Drawing Sheets
Specification includes a Sequence Listing.

(56) References Cited

OTHER PUBLICATIONS

International Search Report for PCT Patent Application No. PCT/EP2021/059814, Issued on Jul. 12, 2021, 5 pages.
Ishibashi, et al., "An inhibitor of viral RNA replication is encoded by a plant resistance gene", Proceedings of the National Academy of Sciences, vol. 104, Issue 34, Aug. 21, 2007, pp. 13833-13838.
Ishibashi, et al., "Coevolution and Hierarchical Interactions of Tomato mosaic virus and the Resistance Gene Tm-1", PLOS Pathogens, vol. 8, Issue 10, Oct. 18, 2012, pp. 1-12.
Lanfermeijer, et al., "The products of the broken Tm-2 and the durable Tm-22 resistance genes from tomato differ in four amino acids", Journal of Experimental Botany, vol. 56, Issue 421, Nov. 2005, pp. 2925-2933.
Luria, et al., "A new Israeli Tobamovirus isolate infects tomato plants harboring Tm-22 resistance genes", PloS One, vol. 12, Issue 1, Jan. 20, 2017, pp. 1-19.
Zinger, et al., "Identification and Mapping of Tomato Genome Loci Controlling Tolerance and Resistance to Tomato Brown Rugose Fruit Virus", Plants, vol. 10, Issue 1, Article No. 179, Jan. 19, 2021, 16 pages.

\* cited by examiner

| SEQ ID NO | chr | gen.pos | phys.pos | 2.5 | 293 | 297 | 301 | all | Evaluation 3 F080293 LOD | F080293 Expl_var | F080297 LOD | F080297 Expl_var | F080301 LOD | F080301 Expl_var | All LOD | All Expl_var |
|---|---|---|---|---|---|---|---|---|---|---|---|---|---|---|---|---|
| SEQ ID NO 18 | 2 | 0.00 | 8,062,225 | | | | | | 12.18 NA | | 8.24 NA | 2.99 3.97 5.54 | | | 22.28 NA | 3.16 4.22 5.57 |
| SEQ ID NO 19 | 2 | 0.00 | 33,522,168 | | | | | | 12.17 NA | 3.11 4.78 6.21 | 8.52 NA | 2.87 4.02 5.49 | 15.10 | 2.42 3.89 5.79 | 34.46 NA | 2.80 4.23 5.82 |
| SEQ ID NO 20 | 2 | 1.08 | 34,284,906 | | | | | | 12.19 | 3.12 4.82 6.25 | 8.65 NA | 2.87 4.02 5.51 | 14.96 NA | 2.40 3.92 5.80 | 34.52 NA | 2.80 4.24 5.86 |
| SEQ ID NO 21 | 2 | 1.45 | 34,517,982 | | | | 34.9 | | 14.07 | 3.11 4.82 6.26 | 8.65 NA | 2.87 4.02 5.51 | 14.93 NA | 2.40 3.92 5.80 | 34.88 15.47 | 2.77 4.25 5.87 |
| SEQ ID NO 22 | 2 | 2.27 | 35,173,023 | | | | 15.1 | | | | 9.04 NA | 2.75 4.06 5.48 | 14.01 NA | 2.49 3.92 5.82 | 33.21 NA | 2.79 4.26 5.86 |
| SEQ ID NO 23 | 2 | 12.33 | 36,807,350 | | | 10.6 | | | 7.37 NA | 3.57 4.71 6.11 | 10.84 13.91 | 2.77 4.08 5.67 | 8.45 NA | 2.99 3.97 5.60 | 26.15 NA | 3.06 4.22 5.80 |
| SEQ ID NO 27 | 2 | 15.89 | 37,565,471 | | 17.2 | | | | 8.04 NA | 3.99 4.66 6.19 | 8.37 NA | 2.88 4.09 5.56 | 8.61 NA | 3.03 3.81 5.74 | 24.84 NA | 3.17 4.17 5.84 |
| SEQ ID NO 28 | 2 | 23.13 | 38,179,529 | | | | | | 6.94 NA | 3.65 4.63 6.08 | 8.39 NA | 2.82 4.18 5.49 | 6.10 NA | 3.08 3.97 5.27 | 21.39 NA | 3.18 4.22 5.83 |
| SEQ ID NO 29 | 2 | 28.07 | 40,136,380 | | | | | | | | 4.74 NA | 3.19 4.08 5.19 | | | 14.69 NA | 3.37 4.17 5.45 |

Figure 3.

```
              1,340                            1,360                    1,380
               |                                |                        |
HEINZ1706  TATTTGTGGG ATTAACAATG TTAGTAAGGT TGTTCTATCT AATGCGGGTG CAGCATTTGC
   GCR26   TATTTGTGGG ATTAACAATG TTAGTAAGGT TGTTCTATCT AATGCGGGTG CAGCATTTGC
   GCR237  TATTTGTGGG ATTAACAATG TCAGTAAGGT TGTTCTATCT AATGCGGGTG CAGCATTTGC
SOURCE01   TATTTGTGGG ATTAACAATG TTAGTAAGGT TGTTCTATCT AATGCGGGTG CAGCATTTGC
```

```
CLUSTAL O(1.2.4) multiple sequence alignment

RUG1-Prot       MASAQSNSPRVFCIGTADTKFDELRFLSQYVRSSLNSFSNKSSFKVGVTVVDVSTSLKET    60
TM1-Prot        MATAQSNSPRVFCIGTADTKFDELRFLSEHVRSSLNSFSNKSSFKVGVTVVDVSTSWKET    60
S1TM1Prot       MATAQSNSPRVFCIGTADTKFDELRFLSEHVRSSLNSFSNKSSFKVGVTVVDVSTSRKET    60
                **:************************:*******************************  ***

RUG1-Prot       NGCADFDFVPRKDVLSCYAQGGESVVQLPDDRGQAIAIMNKAFQTFLSKANGEQNLAGVI   120
TM1-Prot        NSCADFDFVPSKDVLSCHTLGEETMGTFADTRGLAIAIMSKALETFLSIANDEQNLAGVI   120
S1TM1Prot       NSCADFDFVPSKDVLSCYARGEGTVGRFPDIRGQAIAIMNKALETFLSKANGEQNLAGVI   120
                *.********.******:  **.::    *  .* *****.**:.****.**:*******

RUG1-Prot       GLGGSGGTSLLSSAFRSLPIGIPKVIISTVASGQTESYIGTSDLVLFPSVVDICGINNVS   180
TM1-Prot        GLGGSGGTSLLSSAFRSLPIGIPKVIISTVASGQTESYIGTSDLVLFPSVVDICGINNVS   180
S1TM1Prot       GLGGSGGTSLLSSAFRSLPIGIPKVIISTVASGQTESYIGTSDLVLFPSVVDICGINNVS   180
                ************************************************************

RUG1-Prot       KVILSNAGAAFAGMVIGRLETSKENSITTGKFTVGVTMFGVTTPCVNAVKERLVKEGYET   240
TM1-Prot        KVVLSNAGAAFAGMVIGRLESSKEHSITNGKFTVGVTMFGVTTPCVNAVKERLVKEGYET   240
S1TM1Prot       KVVLSNAGAAFAGMVIGRLESSKEHSITNGKFTVGVTMFGVTTPCVNAVKERLVKEGYET   240
                **:*****************:***:***.*******************************

RUG1-Prot       LVFHATGVGGRAMEDLVRAGFIQGVLDITTTEVADYVVGGVMACDSSRFDAILEKKIPLV   300
TM1-Prot        LVFHATGVGGRAMEDLVRGGFIQGVLDITTTEVADYVVGGVMACDSSRFDAILEKKIPLV   300
S1TM1Prot       LVFHATGVGGRAMEDLVRGGFIQGVLDITTTEVADYVVGGVMACDSSRFDAILEKKIPLV   300
                ******************.*****************************************

RUG1-Prot       LSVGALDMVNFGPKTTIPPEFQQRKIHQHNEQVSIMRTTVGENKKFAAFIAEKLNKASSS   360
TM1-Prot        LSVGALDMVNFGPKTTIPPEFQQRKIHEHNEQVSLMRTTVGENKKFAAFIAEKLNKASSS   360
S1TM1Prot       LSVGALDMVNFGPKTTIPPEFQQRKIHQHNEQVSLMHTTVGENKKFAAFIAEKLNKASSS   360
                **************************:******:* *******************

RUG1-Prot       VCVCLPEKGVSALDAPGKEFYDPEATSCLTHELLMLLENNERCQVKVFPCHINDAEFANA   420
TM1-Prot        VCVCLPEKGVSALDAPGKDFYDPEATSCLTRELQMLLENNERCQVKVLPYHINDAEFANA   420
S1TM1Prot       VCVCLPEKGVSALDAPGKDFYDPEATSCLTHELQMLLENNERCQVKVYPYHINDVEFANA   420
                ******************:***********:** *********** * ****.*****

RUG1-Prot       LVDSFLEVSPKSRHVECQPAESKCIQDIQNDNAVLEKYPSCNGKNFSRLNDFPNAKPETL   480
TM1-Prot        LVDSFLEISPKSRHVECQPAESKSIQDIQNDNAVLEKYPSCNGKNFSRLNDFPNAKPETL   480
S1TM1Prot       LVDSFLEMSPKSGHVECQTAESKSIQGIQNVNAVLEKYPSCNGKNFSRLNDFPNAKPETL   480
                *******:**** *****.****.** *** *****************************

RUG1-Prot       QKRTVILQKLKDQISKGKPIIGAGAGTGISAKFEEAGGVDLIVLYNSGRFRMAGRGSLAG   540
TM1-Prot        QKRTVILQKLKDQISKGKPIIGAGAGTGISAKFEEAGGVDLIVLYNSGRFRMAGRGSLAG   540
S1TM1Prot       QKRIVILQKLKDQISKGKPIIGAGAGTGISAKFEEAGGVDLIVLYNSGRFRMAGRGSLAG   540
                *** ********************************************************

RUG1-Prot       LLPFADANAIVLEMANEVLPVVKEVAVLAGVCATDPFRRMDNFLKQLESVGFCGVQNFPT   600
TM1-Prot        LLPFADANAIVLEMANEVLPVVKEVAVLAGVCATDPFRRMDNFLKQLESVGFCGVQNFPT   600
S1TM1Prot       LLPFADANAIVLEMANEVLPVVKEVAVLAGVCATDPFRRMDNFLKQLESVGFCGVQNFPT   600
                ************************************************************

RUG1-Prot       VGLFDGNFRQNLEETGMYGLEVKMIATAHRMGLLTTPYAFCPDEAVAMAEAGADIIVAH   660
TM1-Prot        VGLFDGNFRQNLEETGMYGLEVEMIAAAHRMGLLTTPYAFCPDEAVAMAEAGADIIVAH   660
S1TM1Prot       VGLFDGNFRQNLEETGMYGLEVEMIATAHRMGLLTTPYAFCPDEAVAMAEAGADIIVAH   660
                **********************:***:*********************************

RUG1-Prot       MGLTTSGSIGAKTAVSLEESVTCVQAIADATHRINPDAIVLCHGGPISSPEEAAYVLKRT   720
TM1-Prot        MGLTTSGSIGAKTAVSLEESVTCVQAIADATHRIYPDAIVLCHGGPISSPEEAAYVLKRT   720
S1TM1Prot       MGLTTSGSIGAKTAVSLEESVTCVQAIADATHRINPDAIVLCHGGPISSPEEAAYVLKRT   720
                ********************************* **************************

RUG1-Prot       TGVHGFYGASSMERLPVEQAITATVQQYKSISME   754
TM1-Prot        TGVHGFYGASSMERLPVEQAITATVQQYKSISME   754
S1TM1Prot       TGVHGFYGASSMERLPVEQAITATVQQYKSISME   754
                **********************************
```

SOLANUM LYCOPERSICUM PLANTS HAVING IMPROVED TOBAMOVIRUS RESISTANCE

CROSS-REFERENCE TO RELATED APPLICATIONS

This application is a National Stage Entry of PCT/EP2021/059814, filed Apr. 15, 2021, which claims priority to EP application Ser. No. 20/171,136.3, filed Apr. 23, 2020, the disclosures of each of which are hereby incorporated by reference in their entirety.

FIELD OF THE INVENTION

The present invention relates to the field of plant breeding. Provided is a hybrid *Solanum lycopersicum* plant comprising in its genome at least one copy of the Rug-1 resistance gene, wherein said Rug-1 resistance gene is capable of conferring a Tomato Brown Rugose Fruit Virus (ToBRFV) tolerance/resistance phenotype. The present invention further relates to a seed produced by the plant according to the present invention, a seed from which a plant according to present invention can be grown, a fruit produced by a plant according to the present invention and a part of a plant according to the present invention. The present invention further relates to a method of identifying and/or selecting a plant or plant part according to the present invention. The present invention further relates to a method for producing a *Solanum lycopersicum* plant having a ToBRFV tolerance/resistance phenotype according to the present invention. The present invention further relates to a method for enhancing the ToBRFV tolerance/resistance phenotype of a *Solanum lycopersicum* plant, the use of the Rug-1 resistance gene according to the present invention for enhancing the ToBRFV tolerance/resistance phenotype in a *Solanum lycopersicum* plant and the use of a genetic marker specific of the Rug-1 resistance gene according to the present invention for selecting a *Solanum lycopersicum* plant having an enhanced ToBRFV tolerance/resistance phenotype.

BACKGROUND

Tobamovirus is a genus of viruses in the family Virgaviridae, characterized by the presence of linear single-strand sense genomic RNA. There are currently 35 species in this genus. Disease symptoms associated with viruses of this genus include necrotic lesions on leaves. The name Tobamovirus is an acronym, coming from the type species Tobacco mosaic virus.

Tomato mosaic virus (ToMV) can cause yellowing and stunting of tomato plants, resulting in loss of stand and reduced yield. In addition, the virus may cause uneven ripening of fruit, further reducing yield. Although ToMV infects tomato most commonly, the virus can also infect pepper, potato, eggplant and pepino.

Many commercial plants carry virus resistance genes against ToMV. However, such resistance genes may become ineffective, as resistance breaking strains of a viral species may evolve, or as a new virus species may evolve. In tomato, three dominant ToMV resistance genes have been used to control ToMV. These resistance genes are Tm1 (introgression from *S. habrochaites*; conferring resistance to ToMV strains 0 and 2), Tm2, an introgression from *S. peruvianum*, conferring resistance against ToMV strains 0 and 1, and Tm22, also an introgression from *S. peruvianum*, conferring resistance to 0, 1 and 2.

There is a constant evolutionary race between resistance genes and virus evolution. A new species of tobamovirus was recently identified, referred herein as Tomato Brown Rugose Fruit Virus (ToBRFV), which can infect tomato plants carrying any of the three indicated Tm resistance genes or combinations thereof (see WO2017/012951 A1 and Luria 2017 PLOS ONE 12(1):e0170429). It has been meanwhile described that a QTL on chromosome 11, a QTL on chromosome 6 and a QTL on chromosome 9 may independently confer a limited degree of resistance and/or tolerance against ToBRFV infection in *Solanum lycopersicum* plants (see WO 2018/219941 A1 and WO 2020/18783 A1). Tomato plants comprising one or more QTLs on chromosomes 11, 6 and 9, however, still show undesired disease symptoms upon ToBRFV infection, such as undesired leaf distortion and deformation, mosaic formation and/or spot formation on the fruits. US2020/0077614 A1 teaches that *Solanum lycopersicum* plants having resistance to ToBRFV infection are obtained by combining the Tm-1 resistance gene on chromosome 2 with at least one QTL chosen from the QTL on chromosome 11, the QTL on chromosome 6 and the QTL on chromosome 9 of WO 2018/219941 A1. There is a constant need for the development of additional virus resistance sources in view of the danger that the resistance of a host to a pathogen is lost. It is therefore an object of the invention to provide methods and means for obtaining plants that have an improved resistance against ToBRFV infection in addition to any of the previously described resistance sources.

SUMMARY OF THE INVENTION

The present invention provides a hybrid *Solanum lycopersicum* plant comprising in its genome at least one copy of the Rug-1 resistance gene, wherein the Rug-1 resistance gene confers a Tomato Brown Rugose Fruit Virus (ToBRFV) tolerance/resistance phenotype and wherein the Rug-1 resistance gene encodes a protein comprising at least 95% amino acid sequence identity to SEQ ID NO: 16.

In addition, the present invention provides a seed produced by the hybrid *Solanum lycopersicum* plant according to the present invention, wherein the seed comprises the Rug-1 resistance gene as described herein. The present invention further provides a seed from which the hybrid *Solanum lycopersicum* plant according to the present invention can be grown. The present invention further provides a plant cell, tissue or plant part of the hybrid *Solanum lycopersicum* plant according to present invention or of the seed according to the present invention, comprising the Rug-1 resistance gene as described herein.

In addition, the present invention provides a method for identifying and/or selecting a *Solanum lycopersicum* plant or plant part comprising determining whether said plant or plant part comprises in its genome the Rug-1 resistance gene as described herein.

In addition, the present invention provides a method for producing a *Solanum lycopersicum* plant having a ToBRFV tolerance/resistance phenotype, said method comprising the step(s) of: (i) crossing a first *Solanum lycopersicum* plant and a second plant, wherein the first *Solanum lycopersicum* plant comprises in its genome at least one copy of the Rug-1 resistance gene as described herein; (ii) optionally harvesting seed from the crossing of (i) and selecting seed comprising the Rug-1 resistance gene in its genome.

In addition, the present invention provides a method for enhancing the ToBRFV tolerance/resistance phenotype of a *Solanum lycopersicum* plant, wherein said *Solanum lycopersicum* plant preferably comprises introgressing the Rug-1 resistance gene as described herein into said *Solanum lycopersicum* plant. The present invention further provides the use of the Rug-1 resistance gene as described herein for enhancing the ToBRFV tolerance/resistance phenotype in a *Solanum lycopersicum* plant. The present invention further provides the use of a genetic marker specific of the Rug-1 resistance gene as defined herein for selecting a *Solanum lycopersicum* plant having an enhanced ToBRFV tolerance/resistance phenotype.

BRIEF DESCRIPTION OF THE FIGURES

FIG. 3: Chromosome 2 QTL intervals for evaluation 3.

FIG. 4: Sequence comparison of SOURCE01 and GCR237, containing the Tm-1 resistance gene.

FIG. 7: CLUSTAL multiple amino acid sequence alignment of the RUG-1 protein and TM-1 proteins

DETAILED DESCRIPTION OF THE INVENTION

General Definitions

Figure 1:
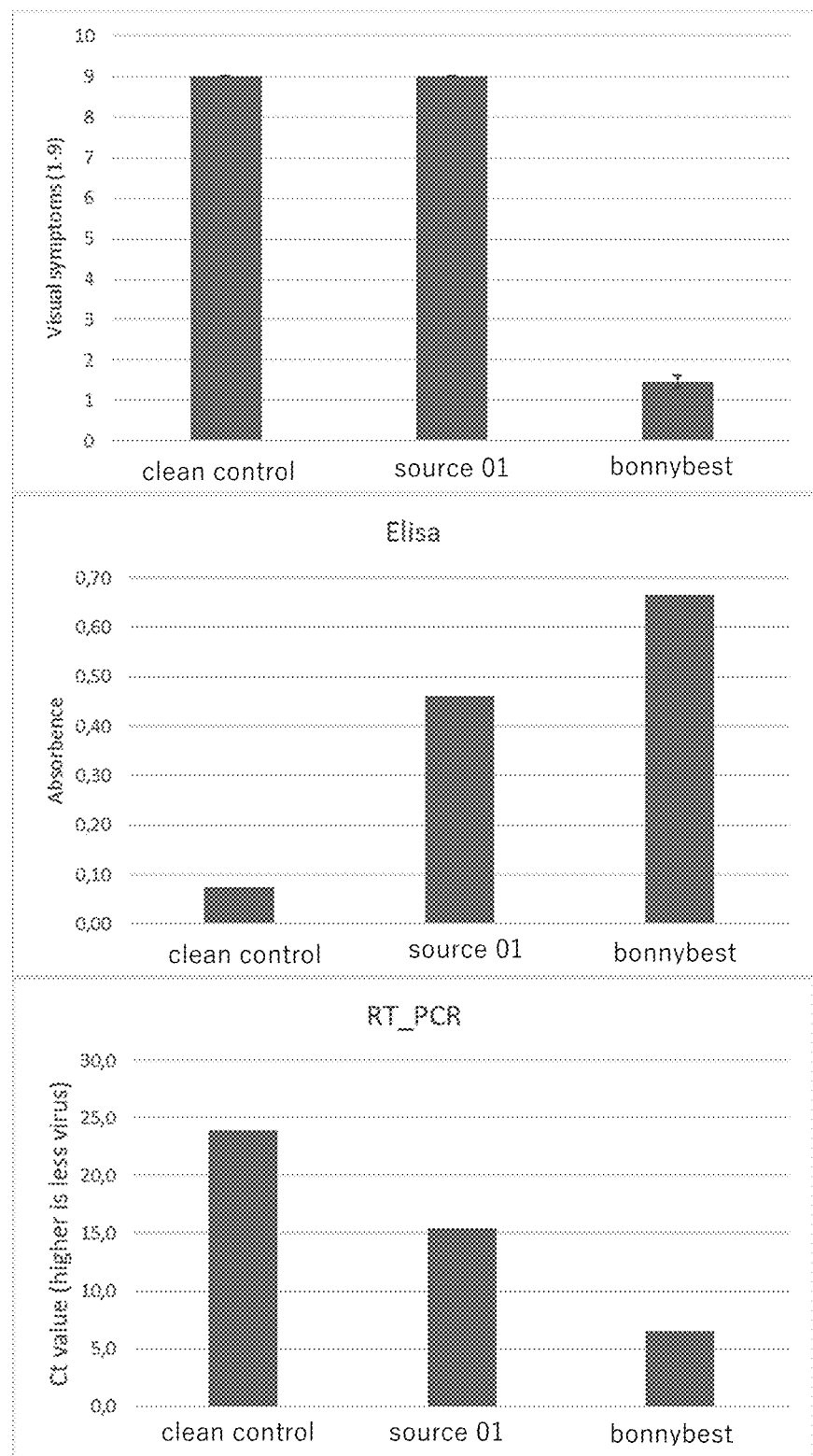
FIG. 1: Results obtained in disease resistance test based on visual evaluation and ToBFRV resistance classification according to Example 1 and ELISA assay.
Figure 2:
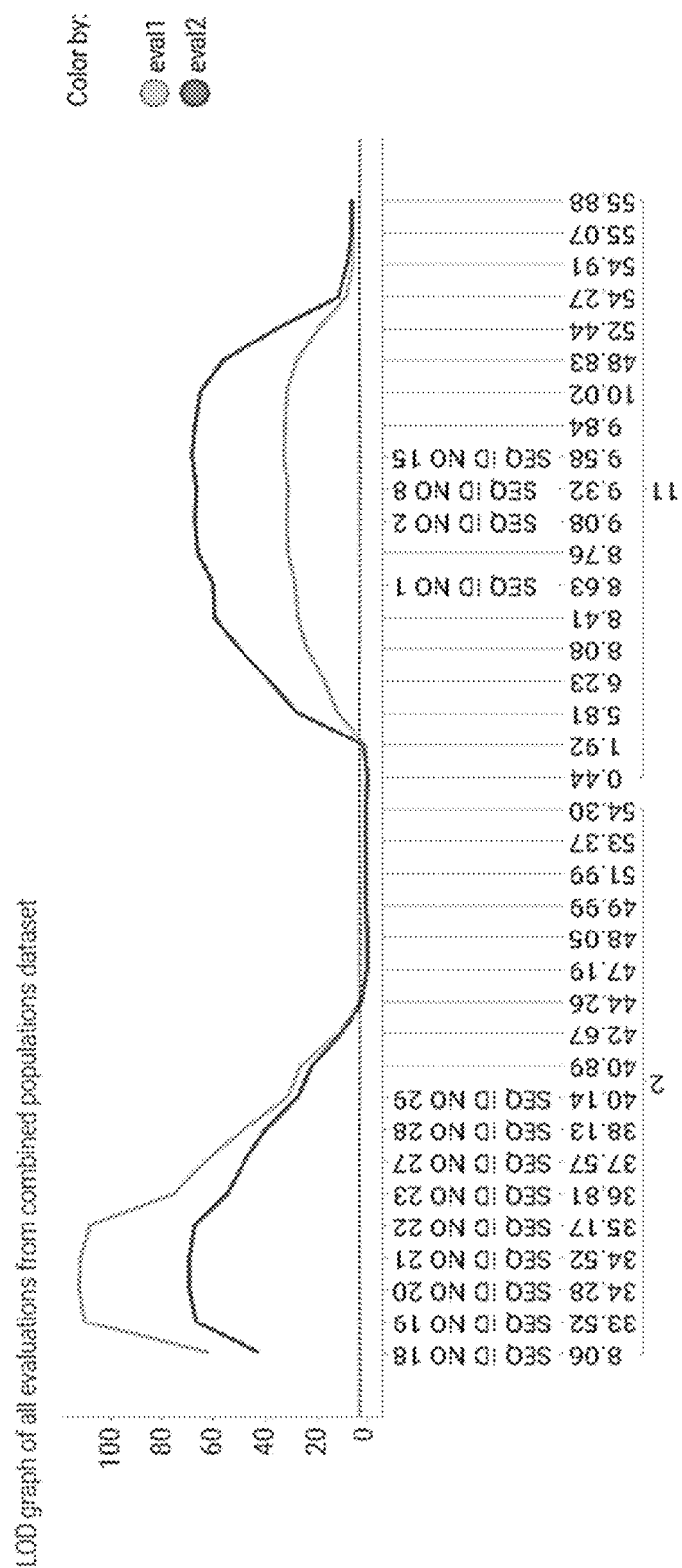
FIG. 2: QTL mapping with three different evaluations corresponding with 14, 28 & 36 dpi (days post inoculation).
Figure 5:
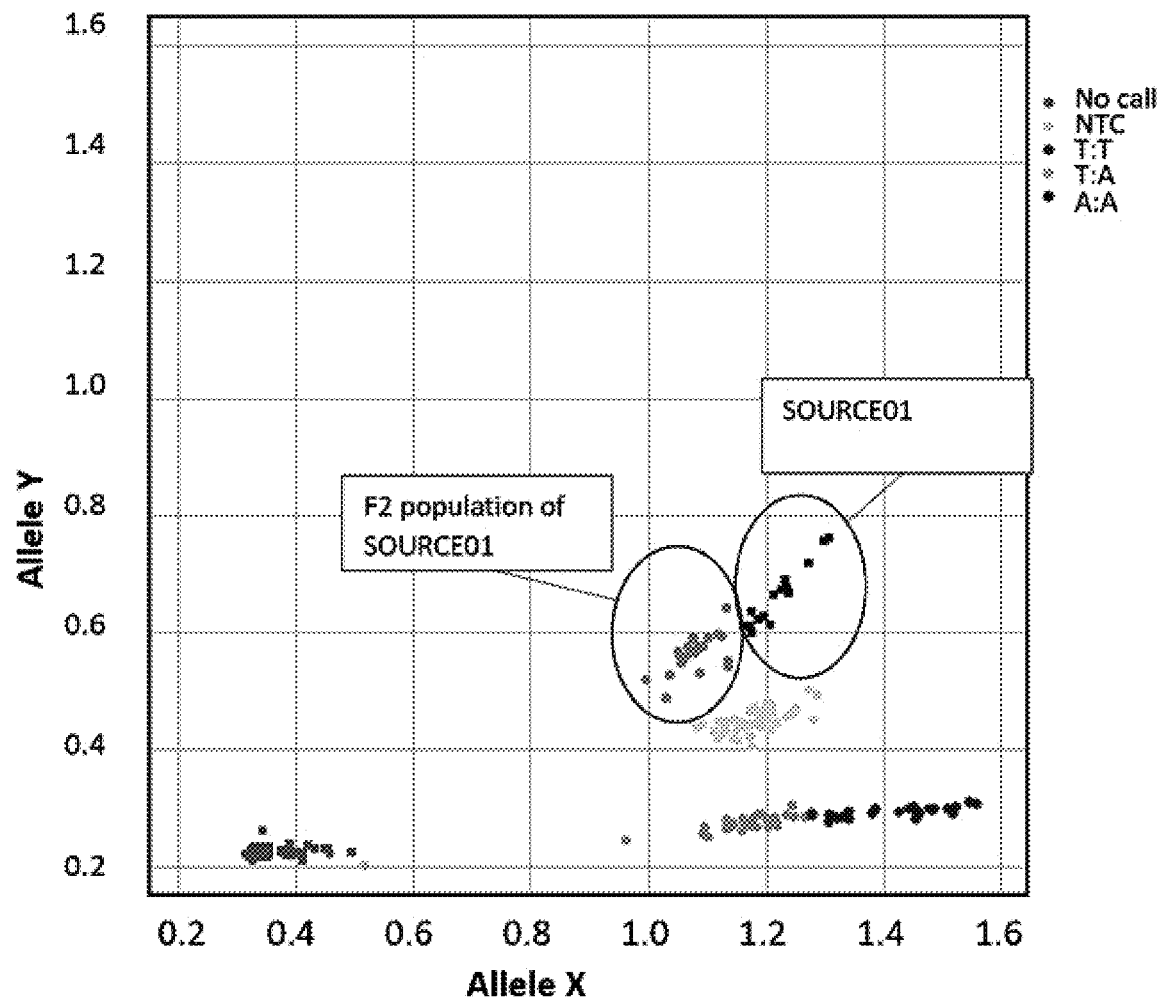
FIG. 5: Cluster plot of SNP_17.
Figure 6:
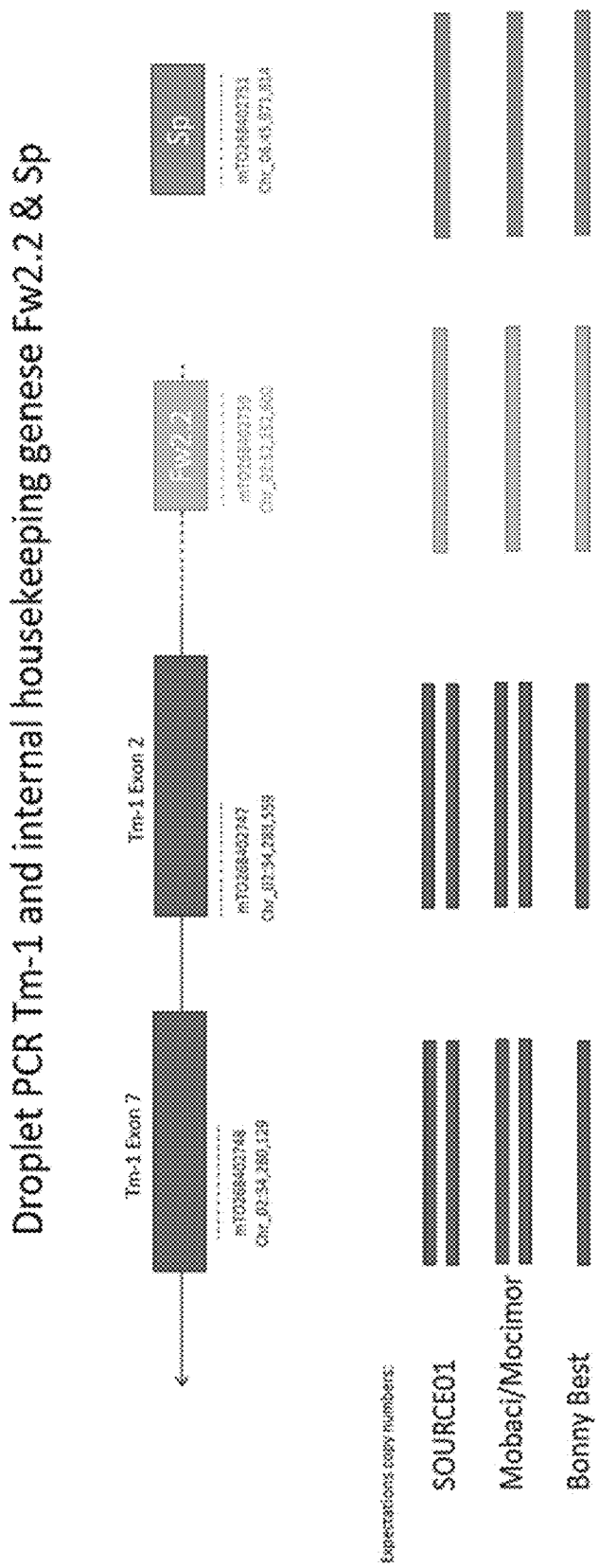
FIG. 6: Visual overview of expected results obtained with Droplet PCR.

It is to be understood that this invention is not limited to the particular methodology or protocols. It is also to be understood that the terminology used herein is for the purpose of describing particular embodiments only and is not intended to limit the scope of the present invention which will be limited only by the appended claims. It must be noted that as used herein and in the appended claims, the singular forms "a," "and," and "the" include plural reference unless the context clearly dictates otherwise. Thus, for example, reference to "a vector" is a reference to one or more vectors and includes equivalents thereof known to those skilled in the art, and so forth. The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent, preferably 10 percent up or down (higher or lower). As used herein, the word "or" means any one member of a particular list and also includes any combination of members of that list. The words "comprise," "comprising," "include," "including," and "includes" when used in this specification and in the following claims are intended to specify the presence of one or more stated features, integers, components, or steps, but they do not preclude the presence or addition of one or more other features, integers, components, steps, or groups thereof. For clarity, certain terms used in the specification are defined and used as follows:

The term "genome" relates to the genetic material of an organism. It consists of DNA. The genome includes both the genes and the non-coding sequences of the DNA.

The term "gene" means a (genomic) DNA sequence comprising a region (transcribed region), which is transcribed into a messenger RNA molecule (mRNA) in a cell, and an operably linked regulatory region (also described herein as regulatory sequence, e.g. a promoter). A gene may thus comprise several operably linked sequences, such as a promoter, a 5' leader sequence comprising e.g. sequences involved in translation initiation, a (protein) coding region (cDNA or genomic DNA) and a 3' non-translated sequence comprising e.g. transcription termination sites. Different alleles of a gene are thus different alternative forms of the gene, which may be in the form of e.g. differences in one or more nucleotides of the genomic DNA sequence (e.g. in the promoter sequence, the exon sequences, intron sequences, etc.), mRNA and/or amino acid sequence of the encoded protein. A gene may be an endogenous gene (in the species of origin) or a chimeric gene (e.g. a transgene or cis-gene). The "promoter" of a gene sequence is defined as a region of DNA that initiates transcription of a particular gene. Promoters are located near the genes they transcribe, on the same strand and upstream on the DNA. Promoters can be about 100-1000 base pairs long. In one aspect the promoter is defined as the region of about 1000 base pairs or more e.g. about 1500 or 2000, upstream of the start codon (i.e. ATG) of the protein encoded by the gene.

"Expression of a gene" refers to a process wherein a DNA region, which is operably linked to appropriate regulatory regions, particularly a promoter, is transcribed into an RNA, which is biologically active, i.e. which is capable of being translated into a biologically active protein or peptide or which is active itself (e.g. in posttranscriptional gene silencing or RNAi). The coding sequence may be in sense-orientation and encodes a desired, biologically active protein or peptide.

The terms "protein" and "polypeptide" are used interchangeably and refer to molecules consisting of a chain of amino acids, without reference to a specific mode of action, size, 3-dimensional structure or origin. A "fragment" or "portion" of a protein may thus still be referred to as a "protein". An "isolated protein" is used to refer to a protein which is no longer in its natural environment, for example in vitro or in a recombinant bacterial or plant host cell.

The terms "peptide sequence" and "amino acid sequence" refer to the primary amino acid sequence of a protein or polypeptide.

As is used herein, a QTL (quantitative trait locus) is a hereditary unit (often indicated by one or more molecular genomic markers) that occupies a specific location on a chromosome and that contains the genetic instruction for a particular phenotypic characteristics or trait in a plant. In contrast to a gene, the exact boundaries of a QTL are not known, but can be found without undue burden by a person skilled in the art by using fine mapping techniques well known in the art of genetic mapping and subsequent DNA sequencing routines. The QTL encodes at least one gene of which the expression, alone or in combination with other genes, results in the phenotypic trait being expressed, or that encodes at least one regulatory region that controls the expression of at least one gene the expression of which, alone or in combination with other genes, results in the phenotypic trait being expressed. A QTL may be defined by indicating its genetic location in the genome of the donor of the introgression that contains the QTL using one or more molecular genomic markers. These one or more markers, in turn, indicate a specific locus.

Distances between loci are usually measured by frequency of crossing-over between loci on the same chromosome. The further apart two loci are, the more likely that a crossover will occur between them. Conversely, if two loci are close together, a crossover is less likely to occur between them. As a rule, one centimorgan (CM) is equal to 1% recombination between loci (markers). When a QTL can be indicated by multiple markers the genetic distance between the end-point markers is indicative of the size of the QTL. Markers that define the QTL may be markers that are linked to the QTL or markers that are in linkage disequilibrium with the QTL.

"Average" refers herein to the arithmetic mean.

It is understood that comparisons between different plant lines involves growing a number of plants of a line (or variety) (e.g. at least 5 plants, preferably at least 10 plants per line) under the same conditions as the plants of one or more control plant lines (preferably wild type plants) and the determination of differences, preferably statistically significant differences, between the plant lines when grown under the same environmental conditions. Preferably the plants are of the same line or variety. More preferably, the control plants are isogenic plants. The term "isogenic plant" refers to two plants which are genetically identical except for the QTL of interest or causal gene of interest.

As used herein, the term "molecular genomic marker" or short "marker" refers to an indicator that is used in methods for visualizing differences in characteristics of nucleic acid sequences. Examples of such indicators are restriction fragment length polymorphism (RFLP) markers, amplified fragment length polymorphism (AFLP) markers, single nucleotide polymorphisms (SNPs), insertion mutations, microsatellite markers (SSRs), sequence-characterized amplified regions (SCARs), cleaved amplified polymorphic sequence (CAPS) markers or isozyme markers or combinations of the markers described herein which defines a specific genetic and chromosomal location.

As used herein, the term "Rug-1 resistance gene" refers to the gene encoding a protein comprising at least 95% (e.g. more preferably 96%, 97%, 98%, 98.3%, 98.7%, 99.0%, or 99.3% or most preferably 99.7%) amino acid sequence identity to SEQ ID NO:16. Such a protein encoded by the Rug-1 resistance gene is described herein as the "RUG-1" protein. Without being bound to the theory, the RUG-1 protein is believed to act as an inhibitor of viral RNA replication with a specific and/or enhanced effect on ToBRFV replication. A nucleic acid sequence encoding the RUG-1 protein according to the present invention may the nucleic acid sequence of SEQ ID NO: 17. Preferably, the Rug-1 resistance gene is as present in, or as obtainable from, or as obtained from, or as comprised in the genome of a *Solanum lycopersicum* plant designated PAR02001 of which a representative number of seeds have been deposited under deposit number NCIMB 43590.

As used herein, the term "the Tm-1 resistance gene" refers to The Tm-1 resistance gene is described in Ishibashi et al. (2007) PNAS 104(34) 13833-13838 and is known to encode a polypeptide of 80 kDa which acts as an inhibitor of viral RNA replication. Preferably, the Tm-1 resistance gene is as present in, or as obtainable from, or as obtained from, or as comprised in the genome of a *Solanum lycopersicum* plant designated PAR02001 of which a representative number of seeds have been deposited under deposit number NCIMB 43590. Accordingly, the Tm-1 resistance gene encodes a protein comprising at least 98% e.g. more preferably 98.3%, 98.7%, 99.0%, or 99.3% or most preferably 99.7%) amino acid sequence identity to SEQ ID NO: 21 and is also referred herein to as the "TM-1" protein. A nucleic acid sequence encoding the TM-1 protein according to the present invention accordingly may the nucleic acid sequence of SEQ ID NO: 22.

"Sequence identity" and "sequence similarity" can be determined by alignment of two peptide or two nucleotide sequences using global or local alignment algorithms. Sequences may then be referred to as "substantially identical" or "essentially similar" when they share at least a certain minimal percentage of sequence identity (as defined further below) after optimally alignment by, for example, the program GAP or BESTFIT or the Emboss program "Needle" (using default parameters, see below). These programs use the Needleman and Wunsch global alignment algorithm to align two sequences over their entire length, maximizing the number of matches and minimizing the number of gaps. Generally, the default parameters are used, with a gap creation penalty=10 and gap extension penalty=0.5 (both for nucleotide and protein alignments). For nucleotides the default scoring matrix used is DNAFULL and for proteins the default scoring matrix is Blosum62 (Henikoff & Henikoff, 1992, PNAS 89, 10915-10919). Sequence alignments and scores for percentage sequence identity may for example be determined using computer programs, such as EMBOSS (http://www.ebi.ac.uk/Tools/psa/emboss_needle/). Alternatively, sequence similarity or identity may be determined by searching against databases such as FASTA, BLAST, etc. Hits are preferably aligned pairwise to compare sequence identity, preferably over the full length of the sequences.

As used herein, two nucleotide sequences have "substantial sequence identity" if the percentage sequence identity is at least 80%, e.g. at least 83%, 85%, 90%, 95%, 96%, 97%, 98%, 98.3%, 98.7%, 99%99.2%, 99.3%, 99.5%, 99.7%, 99.9% or more, preferably as determined over their entire lengths (as determined by Emboss "needle" using default parameters, i.e. gap creation penalty=10, gap extension penalty=0.5, using scoring matrix DNAFULL for nucleic acids).

The term "hybridisation" as used herein is used to indicate hybridisation of nucleic acids at appropriate conditions of stringency as would be readily evident to those skilled in the art depending upon the nature of the probe sequence and target sequences. Conditions of hybridisation and washing are well known in the art, and the adjustment of conditions depending upon the desired stringency by varying incubation time, temperature and/or ionic strength of the solution are readily accomplished. See, for example, Sambrook, J. et al., Molecular Cloning: A Laboratory Manual, 2nd edition, Cold Spring Harbor Press, Cold Spring Harbor, New York, 1989. The choice of conditions is dictated by the length of the sequences being hybridised, in particular, the length of the probe sequence, the relative G-C content of the nucleic acids and the amount of mismatches to be permitted. Low stringency conditions are preferred when partial hybridisation between strands that have lesser degrees of complementarity is desired. When perfect or near perfect complementarity is desired, high stringency conditions are preferred. When reference is made to a nucleic acid sequence (e.g. DNA or genomic DNA) having "substantial sequence identity to" a reference sequence or having a sequence identity of at least 80%, e.g. at least 83%, 85%, 90%, 95%, 96%, 97%, 98%, 98.3%, 98.7%, 99%, 99.2%, 99.3%, 99.5%, 99.7%, 99.9% nucleic acid sequence identity to a reference sequence, in one embodiment said nucleotide sequence is considered substantially identical to the given nucleotide sequence and can be identified using stringent hybridisation conditions. In another embodiment, the nucleic acid sequence comprises one or more mutations compared to the given nucleotide sequence but still can be identified using stringent hybridization conditions.

"Stringent hybridisation conditions" can be used to identify nucleotide sequences, which are substantially identical to a given nucleotide sequence. Stringent conditions are sequence dependent and will be different in different circumstances. Generally, stringent conditions are selected to be about 5° C. lower than the thermal melting point (Tm) for the specific sequences at a defined ionic strength and pH. The Tm is the temperature (under defined ionic strength and pH) at which 50% of the target sequence hybridises to a perfectly matched probe. Typically, stringent conditions will be chosen in which the salt concentration is about 0.02 molar at pH 7 and the temperature is at least 60° C. Lowering the salt concentration and/or increasing the temperature increases stringency. Stringent conditions for RNA-DNA hybridisations (Northern blots using a probe of e.g. 100 nucleotides) are for example those which include at least one wash in 0.2×SSC at 63° C. for 20 min, or equivalent conditions. Stringent conditions for DNA-DNA hybridisation (Southern blots using a probe of e.g. 100 nucleotides) are for example those which include at least one wash (usually 2) in 0.2×SSC at a temperature of at least 50° C., usually about 55° C., for 20 min, or equivalent conditions. See also Sambrook et al. (1989) and Sambrook and Russell (2001).

As used herein, the phrase "hybridizes" to a DNA or RNA molecule is used to indicate that a molecule recognizes and hybridizes to another nucleic acid molecule by base pairing, meaning that there is enough sequence similarity between the two nucleic acid molecules to effect hybridization under appropriate conditions.

As used herein, the terms "introgression", "introgressed" and "introgressing" refer to both a natural and artificial process whereby a genomic fragment of one species, variety or cultivar, termed donor parent, is transduced into the genome of another species, variety or cultivar, termed recipient parent, for example by crossing the donor and recipient parent. The process may optionally be completed by back-crossing the resulting plants to the recipient parent, which is than termed recurrent parent. An introgression fragment is present outside of its natural genomic context, meaning that a plant harbouring an introgression fragment from *Solanum pimpinellifolium* is not a *S. pimpinellifolium* plant.

The term "allele(s)" is used to indicate any one or more alternative forms of a gene at a particular locus, all of which alleles relate to one trait or characteristic at a specific locus. In a diploid cell of an organism, alleles of a given gene are located at a specific location, termed locus, on a chromosome. One allele is present on each chromosome of a pair of homologous chromosomes. A diploid plant species may comprise identical alleles of the gene (homozygous) or two different alleles (heterozygous).

The term "locus" refers to a specific location or site on a chromosome where, for example, a gene or genetic marker is present.

As used herein, the term "plant" includes the whole plant or any parts or derivatives thereof, such as plant organs (e.g., harvested or non-harvested fruits, leaves, seed, flowers, etc.), plant cells, plant protoplasts, plant cell or tissue cultures from which whole plants can be regenerated, plant calli, plant cell clumps, and plant cells that are intact in plants, or parts of plants, such as embryos, pollen, ovules, ovaries, fruits (e.g., harvested tissues or organs, such as harvested pepper fruits or parts thereof), flowers, leaves, seeds, clonally propagated plants, roots, root-stocks, stems, root tips and the like. Also, any developmental stage is included, such as seedlings, immature and mature, etc.

A "plant line" or "breeding line" refers to a plant and its progeny. As used herein, the term "inbred line" refers to a plant line which has been repeatedly selfed, preferably more than three time, more preferably more than 6 times.

The term "cultivar" (or "cultivated" plant) is used herein to denote a plant having a biological status other than a "wild" status, which "wild" status indicates the original non-cultivated, non-domesticated, or natural state of a plant or accession, and the term cultivated does not include such wild, or weedy plants. The term cultivar does include material with good agronomic characteristics, such as breeding material, research material, breeding lines, elite breeding lines, synthetic population, hybrid, founder stock/base population, inbred lines, cultivars (open pollinated of hybrid cultivar), segregating population, mutant/genetic stock, and advanced/improved cultivar. In one embodiment the term cultivar also includes landraces, i.e. plants (or populations) selected and cultivated locally by humans over many years and adapted to a specific geographic environment and sharing a common gene pool. Cultivars have good agronomic properties compared to wild accessions such as high yielding, bigger fruit size, higher fertility, higher uniformity of plants and/or fruits, etc.

"Plant variety" is a group of plants within the same botanical taxon of the lowest grade known, which (irrespective of whether the conditions for the recognition of plant breeder's rights are fulfilled or not) can be defined on the basis of the expression of characteristics that result from a certain genotype or a combination of genotypes, can be distinguished from any other group of plants by the expression of at least one of those characteristics, and can be regarded as an entity, because it can be multiplied without any change. Therefore, the term "plant variety" cannot be used to denote a group of plants, even if they are of the same kind, if they are all characterized by the presence of one locus or gene (or a series of phenotypical characteristics due to this single locus or gene), but which can otherwise differ from one another enormously as regards the other loci or genes.

The term Solanaceae refers to a family of plants, which include genera (especially the genus *Solanum* and the genus *Capsicum*) that comprise fruit and vegetable species which are cultivated and bred by humans, such as e.g. *Solanum lycopersicum* (tomato), *Capsicum annuum* (pepper), *Solanum melongena* (eggplant) and *Solanum muricatum* (pepino).

"Tomato plants" or "cultivated tomato plants" are plants of *Solanum lycopersicum*, i.e. varieties, breeding lines or cultivars of the species *Solanum lycopersicum*, cultivated by humans and having good agronomic characteristics; preferably such plants are not "wild plants", i.e. plants which generally have much poorer yields and poorer agronomic characteristics than cultivated plants and e.g. grow naturally in wild populations.

"Wild plants" include for example wild accessions or wild relatives of a species. In one aspect of the invention so-called heirloom tomato varieties or cultivars, i.e. open pollinated varieties or cultivars commonly grown during earlier periods in human history and often adapted to specific geographic regions, are encompassed herein as cultivated tomato plants.

Wild relatives of tomato include *S. arcanum, S. chmielewskii, S. neorickii (=Lycopersicon parviflorum), S. cheesmaniae, S. galapagense, S. pimpinellifolium, S. chilense, S. corneliomulleri, S. habrochaites (=L. hirsutum), S. huaylasense, S. sisymbriifolium, S. peruvianum, S. hirsutum, S. pennellii, S. lycopersicoides, S. sitiens* and *S. ochranthum.*

The terms "F1, F2, etc." refer to the consecutive related generations following a cross between two parent plants or parent lines. The plants grown from the seeds produced by crossing two plants or lines is called the F1 generation. Selfing the F1 plants results in the F2 generation, etc. The term "hybrid" plant (or hybrid seed) refers to a plant or seed obtained from crossing two inbred parent lines. The term "F1 hybrid" plant (or "F1 hybrid" seed or "F1 seed") refers to a first generation plant or seed obtained from crossing two inbred parent lines.

A tomato plant according to the invention may be determinate or indeterminate. The tomato fruit may have different sizes and shapes, such as cherry, bell, blocky, currant, deep round oval or roma, flattened globe, grape, long blocky, long pointed, oxheart, pear, beefsteak, round, small pear, small pointed, stuffer, plum. The skin colour of the tomato may vary from deep red, purple, bright red, to yellow, and even pink. Recognized skin colours of tomatoes are for example, dark, bi-colour, deep pink, golden, green, orange, pink, red, white, and yellow.

The terms "progeny", "progenies" and "descendants", as used herein, refer to any and all offspring that are derivable from or obtainable from a plant of the invention that comprises the ToBRFV tolerance/resistance phenotype described herein and/or the one or more ToBRFV tolerance/resistance phenotype QTLs in homozygous or heterozygous form. Progeny may be derived by cell culture or by tissue culture, or by producing seeds of a plant. The term progeny may also encompass plants derived from crossing of at least one resistant parent plant with another plant of the same or another variety or (breeding) line. A progeny is directly derived from, obtained from, obtainable from or derivable from the parent plant by, e.g., traditional breeding methods (selfing and/or crossing) or regeneration or transformation. However, the term "progeny" generally encompasses further generations such as second, third, fourth, fifth, sixth, seventh or more generations, i.e., generations of plants which are derived from, obtained from, obtainable from or derivable from the former generation by, e.g., traditional breeding methods, regeneration or genetic transformation techniques. For example, a second generation progeny can be produced from a first generation progeny by any of the methods mentioned above.

The term Tomato Brown Rugose Fruit Virus (ToBRFV), as is used herein, refers to a new species of tobamovirus, as was determined by sequencing of the viral genome and as disclosed in WO2017/012951 A1. A strain of the virus was isolated and is referred to as strain VE484, which was deposited at the DSMZ. The strain VE484 is able to infect cultivated tomato plants comprising the widely used resistance genes Tm1, Tm2 and Tm22. It is also able to infect other Solanaceae, especially members of the genus *Capsicum*, such as cultivated pepper, and likely other members of the genus *Solanum*, besides *Solanum lycopersicum* (tomato), such as wild relatives of tomato, *Solanum melongena* (eggplant) and *Solanum muricatum* (pepino). The genome sequence of this positive sense single stranded RNA virus as disclosed in WO2017/012951 A1 encodes four ORFs (Open Reading Frames). The entire genome is 6402 bases long and has only 82% sequence identity over the entire length to the most similar virus, Genbank accession FR878069.1 (Tobacco Mosaic Virus Strain Ohio V, complete genome, genomic RNA). According to the species demarcation criteria proposed in the book "Virus Taxonomy: 9th report of the International Committee on Virus Taxonomy", ISBN 978-0-12-384684-6, p 1155, viruses with nucleotide genome sequences with less than 90% sequence identity are proposed to be classified as a new genus.

A plant is said to have a ToBRFV tolerance/resistance phenotype if disease symptoms are reduced after infection with ToBRFV, when compared to a control plant, if the plant remains free of disease after infection, and/or if the viral titer is reduced when compared to a control plant. Evaluation of ToBFRV tolerance/resistance is preferably performed by visual observation, looking at different symptomatology (including mosaic, stunting, systemic chlorosis, and sometimes systemic necrosis with an associated leaf deformation) as described in the Examples herein below. The disease symptoms include necrotic lesions and mosaic symptoms in a leaf sample. Localized symptoms, indicating that the virus does not spread after inoculation of a plant with ToBRFV, is indicative of a plant that is resistant to ToBRFV. ToBRFV tolerance/resistance can, for example, be assessed using a standardized ToBRFV resistance test using a ToBRFV inoculum or alternatively in the field, tunnel or greenhouse in growing areas where natural ToBRFV occurs. Various ToBRFV resistance assays are possible, e.g. as described in the ToBRFV resistance test in the Examples of this document. In general a ToBRFV resistance test may, for example, involve artificial inoculation of the leaves of a plurality of plants when the plants are at least 2 weeks old (e.g. 2 weeks old, 3 weeks old, 4 weeks old, 5 weeks old, 6 weeks old, 7 weeks old, 8 weeks old or more), optionally followed by a second inoculation of the leaves e.g. 1 week later, 2 week later, or 3 weeks later, incubating the plants and control plants for a suitable period of time and under suitable conditions. The susceptible control should be severely symptomatic for the test to be successful (e.g. at least 30%, preferably at least 40%, or 50%, or more than 60% (>>50%) of the leaf area showing mosaic and leaf distortion/deformation). Preferably at least 5 e.g. at least 10, 20, 30, 40, 50 or even more than 200 plants per genotype are included in each replicate and preferably several replicates are carried out. In one aspect, when testing resistance, a line or variety is considered "resistant" if at least 90%, 95% or 100% of the plants of the line or variety shows less than 25% of leaf area showing mosaic symptoms and/or leaf rolling/distortion (e.g. 20%, 15%, 10%, 5%, or even less than 5% or more preferably absence of symptoms (0%)), while at least 50%, 60%, 70%, 80%, 90% or more plants of the susceptible control line or variety shows more than 25% of leaf area showing mosaic symptoms and/or leaf rolling/distortion (e.g. 30%, 45%, 50%, 55%, 60%, 65%, 70%, 75%, 80%, 85%, 90%, 95%, or even more than 95% or more preferably no resistance (100%)). In another aspect, a plant is considered to show a high level of ToBRFV tolerance/resistance when it scores a 6 or higher e.g. 7, 8, or most preferably 9, in the ToBRFV resistance test protocol as defined in the Examples of this document. A plant is considered to have an intermediate level of ToBRFV tolerance/resistance when it scores a 4 or 5 in the ToBRFV resistance test protocol as defined in the Examples of this document. A plant is considered to have a low level of ToBRFV tolerance/resistance when it scores a 2 or 3 in the ToBRFV resistance test protocol as defined in the Examples of this document. A plant is considered to have no ToBRFV tolerance/resistance when it scores a 1 in the ToBRFV resistance test protocol as defined in the Examples of this document. Alternatively, or in addition to visual observation, evaluation of ToBFRV tolerance/resistance may be performed by quantitative enzyme-linked immunosorbent assay (ELISA) and/or reverse transcription polymerase chain reaction (RT-PCR) to check virus titer.

It is understood that a comparison between different plant lines involves growing a number of plants of a line (e.g. at least 5 plants, preferably at least 10 plants per line) under the same conditions as control plants and the determination of statistically significant differences between the plant lines when grown under the same environmental conditions. Preferably the plants are of the same line or variety.

A "virus suspension" or a "virus inoculate" is prepared, for example, by grinding 10 g of infected leaves (frozen and/or fresh leaves) in 100 ml of phosphate buffer 0.03 M. Plants, preferably young plants such as 15 days old plants, may be inoculated with said virus suspension by mechanical inoculation of the virus on healthy plants, for instance by gently contacting leaves with an amount of the suspension. As an alternative, a portion of a diseased leaf may be rubbed directly onto a leaf of a plant that is to be infected. The leaves are preferably pre-treated in order to damage the lower epidermis and enhance entry of the virus. This may for instance be achieved by pre-dusting the leaves with carborundum powder, or by sprinkling with celite powder, as is known to the skilled person. Excessive wounding is preferably avoided. After inoculation, the plants may be incubated at 25° C. day; 20° C. night with a photoperiod of 16 hour light.

Evaluation of the inoculated plants may be performed at any time after inoculation, for example at 15 days after inoculation or when the first symptoms appear. Evaluation of the screening is preferably performed by visual observation looking at different symptomatology (including mosaic, stunting, systemic chlorosis, and sometimes systemic necrosis with an associated leaf deformation), quantitative enzyme-linked immunosorbent assay (ELISA) and Reverse transcription polymerase chain reaction (RT-PCR) to check virus titer.

In this document and in its claims, the verb "to comprise" and its conjugations is used in its non-limiting sense to mean that items following the word are included, but items not specifically mentioned are not excluded. In addition, reference to an element by the indefinite article "a" or "an" does not exclude the possibility that more than one of the elements is present, unless the context clearly requires that there be one and only one of the elements. The indefinite article "a" or "an" thus usually means "at least one". It is further understood that, when referring to "sequences" herein, generally the actual physical molecules with a certain sequence of subunits (e.g. amino acids or nucleic acids) are referred to.

Plants of the Invention

The present invention provides a hybrid *Solanum lycopersicum* plant comprising in its genome at least one copy of the Rug-1 resistance gene, wherein the Rug-1 resistance gene confers (i.e. is capable of conferring) a Tomato Brown Rugose Fruit Virus (ToBRFV) tolerance/resistance phenotype and wherein the Rug-1 resistance gene encodes a protein comprising at least 95% amino acid sequence identity to SEQ ID NO: 16.

The inventors surprisingly found that *Solanum lycopersicum* plants comprising at least one copy of the Rug-1 resistance gene as described herein show a ToBRFV tolerance/resistance phenotype. It was further surprisingly found that the observed ToBRFV tolerance/resistance phenotype resulting from said at least one copy of the Rug-1 resistance gene is not caused by the Tm-1 resistance gene on chromosome 2.

The Rug-1 resistance gene according to the present invention when comprised in the genome of a *Solanum lycopersicum* plant accordingly confers a ToBRFV tolerance/resistance phenotype. Means and methods for determining whether a given *Solanum lycopersicum* plant shows a ToBRFV tolerance/resistance phenotype are well known in the art. Preferably, the ToBRFV tolerance/resistance phenotype is determined by visual observation looking at different symptomatology (including mosaic, stunting, systemic chlorosis, and sometimes systemic necrosis with an associated leaf deformation), most preferably by using the test as described in the Examples herein below.

The *Solanum lycopersicum* plant provided by the present invention is a hybrid *Solanum lycopersicum* plant and thus not an inbred *Solanum lycopersicum* plant. Hybrid plants may have advantages such as improved uniformity, vitality and/or disease tolerance. The Rug-1 resistance gene comprised in the hybrid plant of the present invention is comprised in an introgression fragment that is obtained from a proprietary *Solanum lycopersicum* inbred plant line referred herein to as SOURCE01. In a further preferred embodiment, the *Solanum lycopersicum* plant according to the present invention is a F1 hybrid plant, more preferably a single cross F1 hybrid plant.

Without being bound to theory, it is believed that the Rug-1 resistance gene encodes a polypeptide of which acts as an inhibitor of viral RNA replication by binding to and inhibiting the function of the replication proteins of tobamoviruses including ToBRFV and which has a different and/or higher binding activity and/or inhibitory activity than other previously known polypeptides that function as an inhibitor of tobamoviruses, such as the polypeptide encoded by the Tm-1 resistance gene.

The Rug-1 resistance gene according to the present invention encodes a protein comprising at least 95% amino acid sequence identity to SEQ ID NO: 16, e.g. more preferably 96%, 97%, 98%, 98.3%, 98.7%, 99.0%, or 99.3% or most preferably 99.7% sequence identity to SEQ ID NO: 16, (as determined using methods discloses elsewhere herein).

In one aspect, the present invention provides a *Solanum lycopersicum* plant wherein the Rug-1 resistance gene as described herein is present in homozygous form. It was surprisingly found that the ToBRFV tolerance/resistance phenotype of *Solanum lycopersicum* plants homozygous for the Rug-1 resistance gene as described herein show an improved ToBRFV tolerance/resistance phenotype, when compared to plants homozygous for heterozygous for the Rug-1 resistance gene. Such a *Solanum lycopersicum* plant wherein Rug-1 resistance gene is present in homozygous form can be easily obtained from a *Solanum lycopersicum* plant wherein the Rug-1 resistance gene is present in heterozygous form using conventional methods, such as by selfing a *Solanum lycopersicum* plant wherein the Rug-1 resistance gene is present in heterozygous form, optionally followed by selecting the offspring comprising the Rug-1 resistance gene in homozygous form.

The Rug-1 resistance gene according to the present invention thus preferably confers a ToBRFV tolerance/resistance phenotype when present in the genome of a *Solanum lycopersicum* plant. A representative sample of *Solanum lycopersicum* seeds comprising the Rug-1 resistance gene as described herein has been deposited and from the deposit, or from descendants of this deposit, the Rug-1 resistance gene of the present invention can be easily transferred into any other plant that can be crossed with the *Solanum lycopersicum* plant, or descendants thereof, grown from the deposited seeds. Alternatively, other donors can be identified which comprise the same the Rug-1 resistance gene. In one aspect, the present invention provides a *Solanum lycopersicum* plant wherein the Rug-1 resistance gene is as present in, or as obtainable from, or as obtained from, or as comprised in the genome of a *Solanum lycopersicum* plant designated PAR02001 of which a representative number of seeds have been deposited under deposit number NCIMB 43590.

In one aspect, the present invention provides a *Solanum lycopersicum* plant wherein the plant is a single cross F1 hybrid or an inbred line. The present invention accordingly provides a single cross F1 hybrid or an inbred line *Solanum lycopersicum* plant a hybrid *Solanum lycopersicum* plant comprising in its genome at least one copy of the Rug-1 resistance gene, wherein the Rug-1 resistance gene] confers a ToBRFV tolerance/resistance phenotype and wherein the Rug-1 resistance gene encodes a protein comprising at least 95% amino acid sequence identity to SEQ ID NO: 16.

In one aspect, the disclosure provides for haploid plants and/or dihaploid (double haploid) plants derived from a hybrid plant of the invention are encompassed herein, which comprise the Rug-1 resistance gene as described herein. Haploid and dihaploid plants can for example be produced by anther or microspore culture and regeneration into a whole plant. For dihaploid production chromosome doubling may be induced using known methods, such as colchicine treatment or the like. So, in one aspect a *Solanum lycopersicum* plant is provided, comprising a ToBRFV tolerance/resistance phenotype as described, wherein the plant is a dihaploid plant.

The Rug-1 resistance gene of the present invention may be combined with other known or yet to be discovered genes and or QTLs capable of conferring a ToBRFV tolerance/resistance phenotype. There is a constant evolutionary race between resistance genes and virus evolution. To reduce the probability that new virus races or new virus species can evolve that break the protection provided by single resistance QTLs and/or resistance genes, it is preferred that plant varieties comprise multiple resistance genes. In addition, such multiple resistance QTLs and/or resistance genes may provide an enhanced tolerance/resistance phenotype when compared to plants comprising only a single resistance QTL and/or resistance gene. In one aspect, accordingly, the *Solanum lycopersicum* plant of the present invention further comprises one or more of the QTL on chromosome 11, the QTL on chromosome 6 and the QTL on chromosome 9 as described in WO 2018/219941 A1 and WO 2020/18783 A1.

In one aspect, accordingly, the *Solanum lycopersicum* plant of the present invention further comprises Quantitative Trait Locus QTL11 on chromosome 11 located between SEQ ID NO: 1 and SEQ ID NO: 13 and wherein said QTL11 is capable of conferring a ToBRFV tolerance/resistance phenotype when present in homozygous form. In the context of the present invention, it was found that the ToBRFV tolerance/resistance phenotype of *Solanum lycopersicum* plants comprising both QTL11 in homozygous form and the Rug-1 resistance gene show an improved ToBRFV tolerance/resistance phenotype, when compared to plants comprising only the Rug-1 resistance gene or plants comprising only QTL11 in homozygous form.

QTL11 as described herein comprises a haplotype that can be characterized by the presence of one or more of the SNP markers SNP_1 to SNP_15 as described herein in more detail. In one aspect, accordingly, the present invention provides a *Solanum lycopersicum* plant further comprising QTL11, wherein said QTL11 is comprised in an introgression fragment and wherein said introgression fragment comprising QTL11 comprises a haplotype of one or more SNP markers selected from:

an adenine for SNP_01 at nucleotide 51 of SEQ ID NO: 1 or at nucleotide 51 of a sequence comprising at least 97% sequence identity to SEQ ID NO: 1;
an adenine for SNP_02 at nucleotide 51 of SEQ ID NO: 2 or at nucleotide 51 of a sequence comprising at least 97% sequence identity to SEQ ID NO: 2;
a guanine for SNP_03 at nucleotide 51 of SEQ ID NO: 3 or at nucleotide 51 of a sequence comprising at least 97% sequence identity to SEQ ID NO: 3;
an adenine for SNP_04 at nucleotide 51 of SEQ ID NO: 4 or at nucleotide 51 of a sequence comprising at least 97% sequence identity to SEQ ID NO: 4;
an adenine for SNP_05 at nucleotide 51 of SEQ ID NO: 5 or at nucleotide 51 of a sequence comprising at least 97% sequence identity to SEQ ID NO: 5;
a guanine for SNP_06 at nucleotide 51 of SEQ ID NO: 6 or at nucleotide 51 of a sequence comprising at least 97% sequence identity to SEQ ID NO: 6;
a guanine for SNP_07 at nucleotide 51 of SEQ ID NO: 7 or at nucleotide 51 of a sequence comprising at least 97% sequence identity to SEQ ID NO: 7;
an adenine for SNP_08 at nucleotide 51 of SEQ ID NO: 8 or at nucleotide 51 of a sequence comprising at least 97% sequence identity to SEQ ID NO: 8;
a thymine for SNP_09 at nucleotide 51 of SEQ ID NO: 9 or at nucleotide 51 of a sequence comprising at least 97% sequence identity to SEQ ID NO: 9;
a thymine for SNP_10 at nucleotide 51 of SEQ ID NO: 10 or at nucleotide 51 of a sequence comprising at least 97% sequence identity to SEQ ID NO: 10;
an adenine for SNP_11 at nucleotide 51 of SEQ ID NO: 11 or at nucleotide 51 of a sequence comprising at least 97% sequence identity to SEQ ID NO: 11;
a thymine for SNP_12 at nucleotide 51 of SEQ ID NO: 12 or at nucleotide 51 of a sequence comprising at least 97% sequence identity to SEQ ID NO: 12;
a thymine for SNP_13 at nucleotide 51 of SEQ ID NO: 13 or at nucleotide 51 of a sequence comprising at least 97% sequence identity to SEQ ID NO: 13;
a cytosine for SNP_14 at nucleotide 51 of SEQ ID NO: 14 or at nucleotide 51 of a sequence comprising at least 97% sequence identity to SEQ ID NO: 14; and
a thymine for SNP_15 at nucleotide 51 of SEQ ID NO: 15 or at nucleotide 51 of a sequence comprising at least 97% sequence identity to SEQ ID NO: 15.

The SNP markers characterizing for QTL11 accordingly are:
an adenine for SNP_01 at nucleotide 51 of SEQ ID NO: 1 or at nucleotide 51 of a sequence comprising at least 97% (more preferably at least 98% and even more preferably at least 99%) identity to SEQ ID NO: 1;
an adenine for SNP_02 at nucleotide 51 of SEQ ID NO: 2 or at nucleotide 51 of a sequence comprising at least 97% (more preferably at least 98% and even more preferably at least 99%) identity to SEQ ID NO: 2;
a guanine for SNP_03 at nucleotide 51 of SEQ ID NO: 3 or at nucleotide 51 of a sequence comprising at least 97% (more preferably at least 98% and even more preferably at least 99%) identity to SEQ ID NO: 3;
an adenine for SNP_04 at nucleotide 51 of SEQ ID NO: 4 or at nucleotide 51 of a sequence comprising at least 97% (more preferably at least 98% and even more preferably at least 99%) identity to SEQ ID NO: 4;
an adenine for SNP_05 at nucleotide 51 of SEQ ID NO: 5 or at nucleotide 51 of a sequence comprising at least 97% (more preferably at least 98% and even more preferably at least 99%) identity to SEQ ID NO: 5;

a guanine for SNP_06 at nucleotide 51 of SEQ ID NO: 6 or at nucleotide 51 of a sequence comprising at least 97% (more preferably at least 98% and even more preferably at least 99%) identity to SEQ ID NO: 6;

a guanine for SNP_07 at nucleotide 51 of SEQ ID NO: 7 or at nucleotide 51 of a sequence comprising at least 97% (more preferably at least 98% and even more preferably at least 99%) identity to SEQ ID NO: 7;

an adenine for SNP_08 at nucleotide 51 of SEQ ID NO: 8 or at nucleotide 51 of a sequence comprising at least 97% (more preferably at least 98% and even more preferably at least 99%) identity to SEQ ID NO: 8;

a thymine for SNP_09 at nucleotide 51 of SEQ ID NO: 9 or at nucleotide 51 of a sequence comprising at least 97% (more preferably at least 98% and even more preferably at least 99%) identity to SEQ ID NO: 9;

a thymine for SNP_10 at nucleotide 51 of SEQ ID NO: 10 or at nucleotide 51 of a sequence comprising at least 97% (more preferably at least 98% and even more preferably at least 99%) identity to SEQ ID NO: 10;

an adenine for SNP_11 at nucleotide 51 of SEQ ID NO: 11 or at nucleotide 51 of a sequence comprising at least 97% (more preferably at least 98% and even more preferably at least 99%) identity to SEQ ID NO: 11;

a thymine for SNP_12 at nucleotide 51 of SEQ ID NO: 12 or at nucleotide 51 of a sequence comprising at least 97% (more preferably at least 98% and even more preferably at least 99%) identity to SEQ ID NO: 12;

a thymine for SNP_13 at nucleotide 51 of SEQ ID NO: 13 or at nucleotide 51 of a sequence comprising at least 97% (more preferably at least 98% and even more preferably at least 99%) identity to SEQ ID NO: 13;

a cytosine for SNP_14 at nucleotide 51 of SEQ ID NO: 14 or at nucleotide 51 of a sequence comprising at least 97% (more preferably at least 98% and even more preferably at least 99%) identity to SEQ ID NO: 14; and a thymine for SNP_15 at nucleotide 51 of SEQ ID NO: 15 or at nucleotide 51 of a sequence comprising at least 97% (more preferably at least 98% and even more preferably at least 99%) identity to SEQ ID NO: 15.

Preferably, QTL11 as described herein comprises a haplotype that can be characterized by the presence of 2 or more of the SNP markers SNP_1 to SNP_15 as described herein, more preferably 3 or more of the SNP markers SNP_1 to SNP_15 as described herein, even more preferably 4 or more of the SNP markers SNP_1 to SNP_15 as described herein, and particularly preferably 5 or more of the SNP markers SNP_1 to SNP_15 as described herein.

The plant according to the present invention further comprising QTL11 as described herein accordingly comprises at least one copy of QTL11. Such a plant thus may be heterozygous for QTL11 or homozygous for QTL11. QTL11 as described herein is recessive. This means that at least one copy of QTL11 needs to be comprised on both chromosomes 11 as comprised in the genome of a Solanum lycopersicum plant in order to achieve the ToBRFV tolerance/resistance phenotype conferred by said QTL11. In one aspect, the present invention provides a Solanum lycopersicum plant wherein QTL11 is present in homozygous form. Such a Solanum lycopersicum plant wherein QTL11 is present in homozygous form can be easily obtained from a Solanum lycopersicum plant wherein QTL11 is present in heterozygous form using conventional methods, such as selfing a Solanum lycopersicum plant wherein QTL11 is present in heterozygous form, optionally followed by selecting the offspring comprising QTL11 in homozygous form.

The resistance QTL11 according to the present invention thus preferably confers a ToBRFV tolerance/resistance phenotype when present in homozygous form in the genome of a Solanum lycopersicum plant. A representative sample of Solanum lycopersicum seeds comprising QTL11 as described herein has been deposited and from the deposit, or from descendants of this deposit, QTL11 of the present invention can be easily transferred into any other plant that can be crossed with the Solanum lycopersicum plant, or descendants thereof, grown from the deposited seeds. Alternatively, other donors can be identified which comprise the same QTL11, e.g. comprising the same SNP haplotypes for QTL11. In one aspect, the present invention provides a Solanum lycopersicum plant wherein QTL11 is as present in, or as obtainable from, or as obtained from, or as comprised in the genome of a Solanum lycopersicum plant designated PAR02001 of which a representative number of seeds have been deposited under deposit number NCIMB 43590.

In one aspect, the present invention provides a Solanum lycopersicum plant as described herein, wherein said plant further comprises the Tm-1 resistance gene. In the context of the present invention, it was found that the ToBRFV tolerance/resistance phenotype of Solanum lycopersicum plants comprising both the Rug-1 resistance gene and the Tm-1 resistance gene show an improved ToBRFV tolerance/resistance phenotype, when compared to plants comprising only the Rug-1 resistance gene.

The Tm-1 resistance gene is described in Ishibashi et al. (2007) PNAS 104(34) 13833-13838 and is known to encode a polypeptide of 80 kDa which acts as an inhibitor of viral RNA replication. Accordingly, the Tm-1 resistance gene encodes a protein comprising at least 98% amino acid sequence identity to SEQ ID NO: 21.

The plants provided by the present invention accordingly may be used to produce fruits. The present invention thus provides the use of a plant of the species Solanum lycopersicum as provided herein as a crop for consumption. Particularly the fruits produced by the plants of the present invention can be advantageously used as a crop for consumption since these fruits are less likely to show disease symptoms that typically develop after ToBRFV infection.

The plants provided by the present invention may be used to produce propagation material. Such propagation material comprises propagation material suitable for and/or resulting from sexual reproduction, such as pollen and seeds. Such propagation material comprises propagation material suitable for and/or resulting from asexual or vegetative reproduction including, but not limited to cuttings, grafts, tubers, cell culture and tissue culture. The present invention thus further provides the use of a plant of the species Solanum lycopersicum as provided herein as a source of propagation material.

Seeds

In one aspect, the present invention provides seed produced by the Solanum lycopersicum plant according to the present invention, wherein the seed comprises the Rug-1 resistance gene as described herein. Accordingly, the present invention provides seed produced by the hybrid Solanum lycopersicum plant according to the present invention, wherein said seed comprises in its genome at least one copy of the Rug-1 resistance gene wherein the Rug-1 resistance gene confers a ToBRFV tolerance/resistance phenotype and wherein the Rug-1 resistance gene encodes a protein comprising at least 95% (e.g. more preferably 96%, 97%, 98%, 98.3%, 98.7%, 99.0%, or 99.3% or most preferably 99.7%) amino acid sequence identity to SEQ ID NO: 16.

In one aspect, the present invention provides seed from which the hybrid *Solanum lycopersicum* plant according to the present invention can be grown. Accordingly, the present invention provides seed from which a hybrid *Solanum lycopersicum* a hybrid *Solanum lycopersicum* plant comprising in its genome at least one copy of the Rug-1 resistance gene, wherein the Rug-1 resistance gene] confers a ToBRFV tolerance/resistance phenotype and wherein the Rug-1 resistance gene encodes a protein comprising at least 95% (e.g. more preferably 96%, 97%, 98%, 98.3%, 98.7%, 99.0%, or 99.3% or most preferably 99.7%) amino acid sequence identity to SEQ ID NO: 16 can be grown.

Furthermore, the invention provides a plurality of seed according to the present invention. A seed of the invention can be distinguished from other seeds due to the presence of the Rug-1 resistance gene as described herein, either phenotypically (based on the ToBRFV resistance phenotype of the present invention) and/or using molecular methods to detect the presence of the Rug-1 resistance gene in the cells or tissues, such as molecular genotyping methods to detect the Rug-1 resistance gene of the present invention or sequencing. Seeds include for example seeds produced by a plant of the invention which is heterozygous for the mutant allele after self-pollination and optionally selection of those seeds which comprise one or two copies of the mutant allele (e.g. by non-destructive seed sampling methods and analysis of the presence of the Rug-1 resistance gene), or seed produced after cross-pollination, e.g. pollination of a plant of the invention with pollen from another tomato plant, preferably from another *Solanum lycopersicum* plant, or pollination of another *Solanum lycopersicum* plant with pollen of a plant of the invention.

The present invention further provides seeds obtained from the methods of producing plants as described herein.

In one aspect, a plurality of seed is packaged into a container (e.g. a bag, a carton, a can etc.). Containers may be any size. The seeds may be pelleted prior to packing (to form pills or pellets) and/or treated with various compounds, including seed coatings.

Plant Parts and Vegetative Reproductions

In a further aspect a plant part, obtained from (obtainable from) a plant of the invention is provided herein, and a container or a package comprising said plant part.

Particularly, the present invention provides a plant cell, tissue or plant part of the hybrid *Solanum lycopersicum* plant according to present invention or of the seed according to the present invention comprising the Rug-1 resistance gene as described herein, preferably wherein the part is selected from the group consisting of a fruit, leaf, anther, pistil, stem, petiole, root, ovule, pollen, protoplast, tissue, seed, flower, cotyledon, hypocotyl, embryo and cell. The various stages of development of the herein described plant parts are comprised in the invention.

In a further aspect, the plant part is a plant cell. In still a further aspect, the plant part is a non-regenerable cell or a regenerable cell. In another aspect the plant cell is a somatic cell.

A non-regenerable cell is a cell which cannot be regenerated into a whole plant through in vitro culture. The non-regenerable cell may be in a plant or plant part (e.g. leaves) of the invention. The non-regenerable cell may be a cell in a seed, or in the seed-coat of said seed. Mature plant organs, including a mature leaf, a mature stem or a mature root, contain at least one non-regenerable cell.

In a further aspect the plant cell is a reproductive cell, such as an ovule or a cell which is part of a pollen. In an aspect, the pollen cell is the vegetative (non-reproductive) cell, or the sperm cell (Tiezzi, Electron Microsc. Review, 1991). Such a reproductive cell is haploid. When it is regenerated into whole a plant, it comprises the haploid genome of the starting plant. If chromosome doubling occurs (e.g. through chemical treatment), a double haploid plant can be regenerated. In one aspect the plant of the invention comprising the Rug-1 resistance gene is a haploid or a double haploid *Solanum lycopersicum* plant according to the present invention.

Moreover, there is provided an in vitro cell culture or tissue culture of the *Solanum lycopersicum* plant of the invention in which the cell- or tissue culture is derived from a plant part described herein, such as, for example and without limitation, a leaf, a pollen, an embryo, cotyledon, hypocotyls, callus, a root, a root tip, an anther, a flower, a seed or a stem, or a part of any of them, or a meristematic cell, a somatic cell, or a reproductive cell.

The present invention further provides a vegetatively propagated plant, wherein said plant is propagated from a plant part according to the present invention.

Further, isolated cells, in vitro cell cultures and tissue cultures, protoplast cultures, plant parts, harvested material (e.g. harvested tomato fruits), pollen, ovaries, flowers, seeds, stamen, flower parts, etc. comprising in each cell at least one copy of the Rug-1 resistance gene of the present invention are provided. Thus, when said cells or tissues are regenerated or grown into a whole *Solanum lycopersicum* plant, the plant comprises the Rug-1 resistance gene capable of conferring a ToBRFV tolerance/resistance phenotype.

Thus, also an in vitro cell culture and/or tissue culture of cells or tissues of plants of the invention is provided. The cell or tissue culture can be treated with shooting and/or rooting media to regenerate a *Solanum lycopersicum* plant.

Also, vegetative or clonal propagation of plants according to the invention is encompassed herein. Many different vegetative propagation techniques exist. Cuttings (nodes, shoot tips, stems, etc.) can for example be used for in vitro culture as described above. Also, other vegetative propagation techniques exist and can be sued, such as grafting, or air layering. In air layering a piece of stem is allowed to develop roots while it is still attached to the parent plant and once enough roots have developed the clonal plant is separated from the parent.

Thus, in one aspect a method is provided comprising:
(a) obtaining a part of a plant of the invention (e.g. cells or tissues, e.g. cuttings),
(b) vegetatively propagating said plant part to generate an identical plant from the plant part.

Thus, also the use of vegetative plant parts of plants of the invention for clonal/vegetative propagation is an aspect of the invention. In one aspect a method is provided for vegetatively reproducing a hybrid *Solanum lycopersicum* plant of the invention comprising the Rug-1 resistance gene as described herein is provided. Also, a vegetatively produced plant comprising the Rug-1 resistance gene as described herein is provided.

In another aspect a plant of the invention, comprising the Rug-1 resistance gene according to the invention, is propagated by somatic embryogenesis techniques.

Also provided is a hybrid *Solanum lycopersicum* plant regenerated from any of the above-described plant parts, or regenerated from the above-described cell or tissue cultures, said regenerated plant comprising in its genome at least one copy of the Rug-1 resistance gene as described herein. This plant can also be referred to as a vegetative propagation of plants of the invention.

The invention also relates to a food or feed product comprising or consisting of a plant part described herein. The food or feed product may be fresh or processed, e.g., canned, steamed, boiled, fried, blanched and/or frozen etc. Examples are sandwiches, salads, juices, sauces, fruit pastes, ketchup or other food products comprising a fruit or a part of a fruit of a plant of the invention.

Methods of Identifying, Selecting and Producing a Plant or Plant Part

The present invention further provides methods wherein a *Solanum lycopersicum* plant as comprising the Rug-1 resistance gene of the present invention is used and/or obtained.

The present invention accordingly provides a method for identifying and/or selecting a *Solanum lycopersicum* plant or plant part comprising determining whether said plant or plant part comprises in its genome the Rug-1 resistance gene as described herein. Accordingly, the present invention provides a method for identifying and/or selecting a *Solanum lycopersicum* plant or plant part comprising determining whether said plant or plant part comprises in its genome at least one copy of the Rug-1 resistance gene, wherein the Rug-1 resistance gene confers a ToBRFV tolerance/resistance phenotype and wherein the Rug-1 resistance gene encodes a protein comprising at least 95% (e.g. more preferably 96%, 97%, 98%, 98.3%, 98.7%, 99.0%, or 99.3% or most preferably 99.7%) amino acid sequence identity to SEQ ID NO: 16. Said method may be used for identifying and/or selecting any *Solanum lycopersicum* plant or plant part, including, but not limited to an inbred *Solanum lycopersicum* plant or plant part, hybrid *Solanum lycopersicum* plant or plant part and dihaploid *Solanum lycopersicum* plant or plant part. Preferably, the present invention provides a method for identifying and/or selecting a hybrid *Solanum lycopersicum* plant or plant part comprising determining whether said plant or plant part comprises in its genome at least one copy of the Rug-1 resistance gene, wherein the Rug-1 resistance gene confers a ToBRFV tolerance/resistance phenotype and wherein the Rug-1 resistance gene encodes a protein comprising at least 95% (e.g. more preferably 96%, 97%, 98%, 98.3%, 98.7%, 99.0%, or 99.3% or most preferably 99.7%) amino acid sequence identity to SEQ ID NO: 16. The method may comprise screening at the DNA, RNA (or cDNA) or protein level using known methods, in order to detect the presence of the Rug-1 resistance gene according to the present invention. There are many methods to detect the presence of an introgression fragment comprising the Rug-1 resistance gene. For example, if there is a single nucleotide difference (single nucleotide polymorphism, SNP) between a plant comprising the gene of interest (such as the Rug-1 resistance gene) or the QTL of interest (such as QTL11) a plant which does not comprise the gene or QTL of interest, a SNP genotyping assay can be used to detect whether a plant or plant part or cell comprises the gene or QTL of interest in its genome. For example, the SNP can easily be detected using a KASP-assay (see world wide web at kpbioscience.co.uk) or other SNP genotyping assays. For developing a KASP-assay, for example 70 base pairs upstream and 70 base pairs downstream of the SNP can be selected and two allele-specific forward primers and one allele specific reverse primer can be designed. See e.g. Allen et al. 2011, Plant Biotechnology J. 9, 1086-1099, especially p 097-1098 for KASP-assay method. Equally other genotyping assays can be used. For example, a TaqMan SNP genotyping assay, a High Resolution Melting (HRM) assay, SNP-genotyping arrays (e.g. Fluidigm, Illumina, etc.) or DNA sequencing may equally be used.

Molecular markers may also be used to aid in the identification of the plants (or plant parts or nucleic acids obtained therefrom) containing the Rug-1 resistance gene of the present invention. For example, one can develop one or more suitable molecular markers which are closely genetically (and preferably also physically) linked to the Rug-1 resistance gene. Suitable molecular markers are preferably selected based on the coding sequence of the Rug-1 gene as disclosed herein. For instance, any SNP which characterizes the Rug-1 resistance gene, e.g. by distinguishing the Rug-1 resistance gene from the Tm-1 resistance gene, may be useful as a molecular marker useful for the identification of the plants (or plant parts or nucleic acids obtained therefrom) containing the Rug-1 resistance gene of the present invention. Such SNP markers may be obtained by a nucleotide sequence alignment between the coding sequence of the Rug-1 resistance gene (e.g. SEQ ID NO: 17) with the Tm-1 resistance gene (e.g. SEQ ID NO: 22).

Suitable molecular markers can be developed using methods well known in the art, e.g. by crossing a *Solanum lycopersicum* plant according to the present invention (preferably having the ToBRFV tolerance/resistance phenotype) with a control plant, preferably an isogenic plant and developing a segregating population (e.g. F2 or backcross population) from that cross. The segregating population can then be phenotyped for the ToBRFV tolerance/resistance phenotype as described herein and genotyped using e.g. molecular markers such as SNPs (Single Nucleotide Polymorphisms), AFLPs (Amplified Fragment Length Polymorphisms; see, e.g., EP 534 858), or others, and by software analysis molecular markers which co-segregate with the ToBRFV tolerance/resistance phenotype of the present invention in the segregating population can be identified and their order and genetic distance (centimorgan distance, cM) to the locus of the QTL of interest (or the causal gene) can be identified. Molecular markers which are closely linked to gene or QTL of interest, e.g. markers at a 5 cM distance or less, can then be used in detecting and/or selecting plants (e.g. plants of the invention or progeny of a plant of the invention) or plant parts comprising or retaining the gene or QTL of interest (e.g. in an introgression fragment). Such closely linked molecular markers can replace phenotypic selection (or be used in addition to phenotypic selection) in breeding programs, i.e. in Marker Assisted Selection (MAS). Preferably, linked markers are used in MAS. More preferably, flanking markers are used in MAS, i.e. one marker on either side of the locus of the QTL of interest.

SNP markers particularly useful to detect the Rug-1 resistance gene according to the present invention may be selected from the group consisting of:

a guanine for SNP_16 at nucleotide 51 of SEQ ID NO: 18 or at nucleotide 51 of a sequence comprising at least 97% (more preferably at least 98% and even more preferably at least 99%) identity to SEQ ID NO: 18;

a thymine for SNP_17 at nucleotide 51 of SEQ ID NO: 19 or at nucleotide 51 of a sequence comprising at least 97% (more preferably at least 98% and even more preferably at least 99%) identity to SEQ ID NO: 19; and a thymine for SNP_18 at nucleotide 51 of SEQ ID NO: 20 or at nucleotide 51 of a sequence comprising at least 97% (more preferably at least 98% and even more preferably at least 99%) identity of SEQ ID NO: 20.

The present invention further provides the use of a genetic marker specific for the Rug-1 resistance gene as described herein for selecting a *Solanum lycopersicum* plant having an enhanced ToBRFV tolerance/resistance phenotype. Preferably, said genetic marker specific of the Rug-1 resistance gene are one or more of the SNP markers SNP_16 to SNP_18 as described herein for the identification of a *Solanum lycopersicum* plant having a ToBRFV tolerance/resistance phenotype, wherein said SNP_16 to SNP_18 are:

- a guanine for SNP_16 at nucleotide 51 of SEQ ID NO: 18 or at nucleotide 51 of a sequence comprising at least 97% (more preferably at least 98% and even more preferably at least 99%) identity to SEQ ID NO: 18;
- a thymine for SNP_17 at nucleotide 51 of SEQ ID NO: 19 or at nucleotide 51 of a sequence comprising at least 97% (more preferably at least 98% and even more preferably at least 99%) identity to SEQ ID NO: 19; and
- a thymine for SNP_18 at nucleotide 51 of SEQ ID NO: 20 or at nucleotide 51 of a sequence comprising at least 97% (more preferably at least 98% and even more preferably at least 99%) identity of SEQ ID NO: 20.

The present invention further provides the use of a nucleic acid encoding a protein having at least 95% amino acid sequence identity to SEQ ID NO: 16, preferably 96%, 97%, 98%, 98.3%, 98.7%, 99.0%, or 99.3% or more preferably 99.7% sequence identity to SEQ ID NO: 16 for breeding *Solanum lycopersicum* plants having a ToBRFV tolerance/resistance phenotype. The present invention further provides the use of a nucleic acid encoding a protein having at least 95% nucleotide sequence identity to SEQ ID NO: 17, preferably 96%, 97%, 98%, 98.3%, 98.7%, 99.0%, or 99.3% or more preferably 99.7% sequence identity to SEQ ID NO: 17 for breeding *Solanum lycopersicum* plants having a ToBRFV tolerance/resistance phenotype.

The present invention further provides the use of one or more of SNP markers SNP_16 to SNP_18 as described herein for breeding *Solanum lycopersicum* plants having a ToBRFV tolerance/resistance phenotype, wherein said SNP markers SNP_16 to SNP_18 are:

- a guanine for SNP_16 at nucleotide 51 of SEQ ID NO: 18 or at nucleotide 51 of a sequence comprising at least 97% (more preferably at least 98% and even more preferably at least 99%) identity to SEQ ID NO: 18;
- a thymine for SNP_17 at nucleotide 51 of SEQ ID NO: 19 or at nucleotide 51 of a sequence comprising at least 97% (more preferably at least 98% and even more preferably at least 99%) identity to SEQ ID NO: 19; and
- a thymine for SNP_18 at nucleotide 51 of SEQ ID NO: 20 or at nucleotide 51 of a sequence comprising at least 97% (more preferably at least 98% and even more preferably at least 99%) identity of SEQ ID NO: 20.

The present invention further provides a method for producing a *Solanum lycopersicum* plant having a ToBRFV tolerance/resistance phenotype, said method comprising the step(s) of: (i) crossing a first *Solanum lycopersicum* plant and a second plant, wherein the first *Solanum lycopersicum* plant comprises in its genome the Rug-1 resistance gene as described herein; (ii) optionally harvesting seed from the crossing of (i) and selecting seed comprising Rug-1 resistance gene in its genome. Accordingly, the present invention further provides a method for producing a *Solanum lycopersicum* plant having a ToBRFV tolerance/resistance phenotype, said method comprising the step(s) of: (i) crossing a first *Solanum lycopersicum* plant and a second plant, wherein the first *Solanum lycopersicum* plant comprises in its genome the Rug-1 resistance gene, wherein the Rug-1 resistance gene confers a ToBRFV tolerance/resistance phenotype and wherein the Rug-1 resistance gene encodes a protein comprising at least 95% (e.g. more preferably 96%, 97%, 98%, 98.3%, 98.7%, 99.0%, or 99.3% or most preferably 99.7%) amino acid sequence identity to SEQ ID NO: 16; (ii) optionally harvesting seed from the crossing of (i) and selecting seed comprising Rug-1 resistance gene in its genome. Said method may be used for producing any *Solanum lycopersicum* plant, including, but not limited to an inbred *Solanum lycopersicum* plant, hybrid *Solanum lycopersicum* plant and dihaploid *Solanum lycopersicum* plant. Preferably, the present invention provides a method for producing an inbred *Solanum lycopersicum* plant having a ToBRFV tolerance/resistance phenotype, said method comprising the step(s) of: (i) crossing a first *Solanum lycopersicum* plant and a second plant, wherein the first *Solanum lycopersicum* plant comprises in its genome the Rug-1 resistance gene, wherein the Rug-1 resistance gene confers a ToBRFV tolerance/resistance phenotype and wherein the Rug-1 resistance gene encodes a protein comprising at least 95% (e.g. more preferably 96%, 97%, 98%, 98.3%, 98.7%, 99.0%, or 99.3% or most preferably 99.7%) amino acid sequence identity to SEQ ID NO: 16; (ii) optionally harvesting seed from the crossing of (i) and selecting seed comprising Rug-1 resistance gene in its genome.

Preferably, both the first *Solanum lycopersicum* plant and the second *Solanum lycopersicum* plant in step (i) of the method of producing the *Solanum lycopersicum* plant as provided herein are plants according to the present invention. More preferably, both the first *Solanum lycopersicum* plant and the second *Solanum lycopersicum* plant in step (i) of the method of producing the *Solanum lycopersicum* plant as provided herein are plants according to the present invention homozygous for the Rug-1 resistance gene.

The present invention further provides a plant, preferably a hybrid plant, grown from seeds obtained by the method of identifying and/or selecting a plant or plant part of the species *Solanum lycopersicum* comprising the the Rug-1 resistance gene as described herein. The present invention further provides a plant, preferably a hybrid plant, grown from seeds obtained by the method of producing a *Solanum lycopersicum* plant comprising in its genome at least one copy of the Rug-1 resistance gene as defined herein.

The present invention further provides a method for enhancing the ToBRFV tolerance/resistance phenotype of a *Solanum lycopersicum* plant, said method comprising introgressing the Rug-1 resistance gene as described herein into said *Solanum lycopersicum* plant. Accordingly, the present invention provides a method for enhancing the ToBRFV tolerance/resistance phenotype of a *Solanum lycopersicum* plant, said method comprising introgressing the Rug-1 resistance gene, wherein the Rug-1 resistance gene confers a ToBRFV tolerance/resistance phenotype and wherein the Rug-1 resistance gene encodes a protein comprising at least 95% (e.g. more preferably 96%, 97%, 98%, 98.3%, 98.7%, 99.0%, or 99.3% or most preferably 99.7%) amino acid sequence identity to SEQ ID NO: 16 into said *Solanum lycopersicum* plant. Said method may be used for enhancing the ToBRFV tolerance/resistance phenotype of any *Solanum lycopersicum* plant, including, but not limited to an inbred *Solanum lycopersicum* plant, hybrid *Solanum lycopersicum* plant and dihaploid *Solanum lycopersicum* plant. Preferably, the present invention provides a method for enhancing the ToBRFV tolerance/resistance phenotype of a hybrid *Sola-*

*num lycopersicum* plant, said method comprising introgressing the Rug-1 resistance gene, wherein the Rug-1 resistance gene confers a ToBRFV tolerance/resistance phenotype and wherein the Rug-1 resistance gene encodes a protein comprising at least 95% (e.g. more preferably 96%, 97%, 98%, 98.3%, 98.7%, 99.0%, or 99.3% or most preferably 99.7%) amino acid sequence identity to SEQ ID NO: 16 into said *Solanum lycopersicum* plant.

The present invention further provides the use of the Rug-1 resistance gene as described herein for enhancing the ToBRFV tolerance/resistance phenotype in a *Solanum lycopersicum* plant. Accordingly, the present invention provides the use of the Rug-1 resistance gene as described herein for enhancing the ToBRFV tolerance/resistance phenotype in a *Solanum lycopersicum* plant, wherein the Rug-1 resistance gene confers a ToBRFV tolerance/resistance phenotype and wherein the Rug-1 resistance gene encodes a protein comprising at least 95% (e.g. more preferably 96%, 97%, 98%, 98.3%, 98.7%, 99.0%, or 99.3% or most preferably 99.7%) amino acid sequence identity to SEQ ID NO: 16 into said *Solanum lycopersicum* plant. Said use may be for enhancing the ToBRFV tolerance/resistance phenotype of any *Solanum lycopersicum* plant, including, but not limited to an inbred *Solanum lycopersicum* plant, hybrid *Solanum lycopersicum* plant and dihaploid *Solanum lycopersicum* plant. Preferably, the present invention the use of the Rug-1 resistance gene for enhancing the ToBRFV tolerance/resistance phenotype in a *Solanum lycopersicum* plant, wherein the Rug-1 resistance gene confers a ToBRFV tolerance/resistance phenotype and wherein the Rug-1 resistance gene encodes a protein comprising at least 95% (e.g. more preferably 96%, 97%, 98%, 98.3%, 98.7%, 99.0%, or 99.3% or most preferably 99.7%) amino acid sequence identity to SEQ ID NO: 16 into said *Solanum lycopersicum* plant.

In one aspect plants, plant parts and cells according to the invention are not exclusively obtained by means of an essentially biological process. Particularly, plants, plant parts and cells according to the invention are not exclusively obtained by means of an essentially biological process as defined by Rule 28(2) EPC.

Other embodiments of the invention relate to the following embodiments, which are not to be seen in isolation but can be combined with any of the other embodiments described herein. Preferably, the herein-below described cell or cells is a non-regenerable cell as defined herein above. Alternatively, the herein-below described cell or cells is a non-propagating cell. As used herein, the term "non-propagating plant cell" is a plant cell which is unable to maintain its life by synthesizing carbohydrate and protein from the inorganic substance, such as water, carbon dioxide and mineral salt and so on through photo-synthesis.

In one embodiment the present invention provides a cell of a hybrid *Solanum lycopersicum* plant comprising in its genome at least one copy of the Rug-1 resistance gene, wherein the Rug-1 resistance gene confers (i.e. is capable of conferring) a ToBRFV tolerance/resistance phenotype and wherein the Rug-1 resistance gene encodes a protein comprising at least 95% amino acid sequence identity to SEQ ID NO: 16.

The cell according to the preceding embodiments, wherein the Rug-1 resistance gene is present in homozygous form.

The cell according to the preceding embodiment, wherein the Rug-1 resistance gene is as present in, or as obtainable from, or as obtained from, or as comprised in the genome of a *Solanum lycopersicum* plant designated PAR02001 of which a representative number of seeds have been deposited under deposit number NCIMB 43590.

The cell according to the preceding embodiments, wherein said cell is of a *Solanum lycopersicum* plant further comprising Quantitative Trait Locus QTL11 on chromosome 11 located between SEQ ID NO: 1 and SEQ ID NO: 13 and wherein said QTL11 is capable of conferring a ToBRFV tolerance/resistance phenotype when present in homozygous form.

The cell according to the preceding embodiments, wherein QTL11 is comprised in an introgression fragment and wherein said introgression fragment comprising QTL11 comprises a haplotype of one or more SNP markers selected from:

an adenine for SNP_01 at nucleotide 51 of SEQ ID NO: 1 or at nucleotide 51 of a sequence comprising at least 97% sequence identity to SEQ ID NO: 1;

an adenine for SNP_02 at nucleotide 51 of SEQ ID NO: 2 or at nucleotide 51 of a sequence comprising at least 97% sequence identity to SEQ ID NO: 2;

a guanine for SNP_03 at nucleotide 51 of SEQ ID NO: 3 or at nucleotide 51 of a sequence comprising at least 97% sequence identity to SEQ ID NO: 3;

an adenine for SNP_04 at nucleotide 51 of SEQ ID NO: 4 or at nucleotide 51 of a sequence comprising at least 97% sequence identity to SEQ ID NO: 4;

an adenine for SNP_05 at nucleotide 51 of SEQ ID NO: 5 or at nucleotide 51 of a sequence comprising at least 97% sequence identity to SEQ ID NO: 5;

a guanine for SNP_06 at nucleotide 51 of SEQ ID NO: 6 or at nucleotide 51 of a sequence comprising at least 97% sequence identity to SEQ ID NO: 6;

a guanine for SNP_07 at nucleotide 51 of SEQ ID NO: 7 or at nucleotide 51 of a sequence comprising at least 97% sequence identity to SEQ ID NO: 7;

an adenine for SNP_08 at nucleotide 51 of SEQ ID NO: 8 or at nucleotide 51 of a sequence comprising at least 97% sequence identity to SEQ ID NO: 8;

a thymine for SNP_09 at nucleotide 51 of SEQ ID NO: 9 or at nucleotide 51 of a sequence comprising at least 97% sequence identity to SEQ ID NO: 9;

a thymine for SNP_10 at nucleotide 51 of SEQ ID NO: 10 or at nucleotide 51 of a sequence comprising at least 97% sequence identity to SEQ ID NO: 10;

an adenine for SNP_11 at nucleotide 51 of SEQ ID NO: 11 or at nucleotide 51 of a sequence comprising at least 97% sequence identity to SEQ ID NO: 11;

a thymine for SNP_12 at nucleotide 51 of SEQ ID NO: 12 or at nucleotide 51 of a sequence comprising at least 97% sequence identity to SEQ ID NO: 12;

a thymine for SNP_13 at nucleotide 51 of SEQ ID NO: 13 or at nucleotide 51 of a sequence comprising at least 97% sequence identity to SEQ ID NO: 13;

a cytosine for SNP_14 at nucleotide 51 of SEQ ID NO: 14 or at nucleotide 51 of a sequence comprising at least 97% sequence identity to SEQ ID NO: 14; and a thymine for SNP_15 at nucleotide 51 of SEQ ID NO: 15 or at nucleotide 51 of a sequence comprising at least 97% sequence identity to SEQ ID NO: 15.

The cell according to the preceding embodiments, wherein QTL11 is present in homozygous form.

The cell according to the preceding embodiments, wherein QTL11 is as present in, or as obtainable from, or as obtained from, or as comprised in the genome of a *Solanum lycopersicum* plant designated PAR02001 of which a representative number of seeds have been deposited under deposit number NCIMB 43590.

The cell according to the preceding embodiments, wherein said cell is of a *Solanum lycopersicum* plant further comprising the Tm-1 resistance gene.

The cell according to the preceding embodiments, wherein said cell is of a a single cross F1 hybrid *Solanum lycopersicum* plant.

A haploid plant or dihaploid cell derived from a hybrid *Solanum lycopersicum* plant comprising in its genome at least one copy of the Rug-1 resistance gene, wherein the Rug-1 resistance gene confers (i.e. is capable of conferring) a ToBRFV tolerance/resistance phenotype and wherein the Rug-1 resistance gene encodes a protein comprising at least 95% amino acid sequence identity to SEQ ID NO: 16.

Seed Deposits

A representative sample of seeds of a *Solanum lycopersicum* line named PAR02001 comprising an introgression fragment comprising the Rug-1 resistance gene in homozygous form, an introgression fragment comprising QTL11 in homozygous form and the Tm-1 resistance gene in heterozygous form were deposited by Nunhems B.V. on 20 Mar. 2020 at the NCIMB Ltd. (Ferguson Building, Craibstone Estate, Bucksburn Aberdeen, Scotland AB21 9YA, UK) according to the Budapest Treaty, under the Expert Solution (EPC 2000, Rule 32(1)). Seeds were given the following deposit numbers NCIMB 43590 (*Solanum lycopersicum* PAR02001).

The Applicant requests that samples of the biological material and any material derived therefrom be only released to a designated Expert in accordance with Rule 32(1) EPC or related legislation of countries or treaties having similar rules and regulation, until the mention of the grant of the patent, or for 20 years from the date of filing if the application is refused, withdrawn or deemed to be withdrawn.

Access to the deposit will be available during the pendency of this application to persons determined by the Director of the U.S. Patent Office to be entitled thereto upon request. Subject to 37 C.F.R. § 1.808(b), all restrictions imposed by the depositor on the availability to the public of the deposited material will be irrevocably removed upon the granting of the patent. The deposit will be maintained for a period of 30 years, or 5 years after the most recent request, or for the enforceable life of the patent whichever is longer and will be replaced if it ever becomes nonviable during that period. Applicant does not waive any rights granted under this patent on this application or under the Plant Variety Protection Act (7 USC 2321 et seq.).

The following non-limiting Examples describe how one can obtain plants according to the invention, comprising the Rug-1 resistance gene and/or QTL11 and/or the Tm-1 resistance gene. Unless stated otherwise in the Examples, all recombinant DNA techniques are carried out according to standard protocols as described in Sambrook et al. (1989) Molecular Cloning: A Laboratory Manual, Second Edition, Cold Spring Harbor Laboratory Press, and Sambrook and Russell (2001) Molecular Cloning: A Laboratory Manual, Third Edition, Cold Spring Harbor Laboratory Press, NY; and in Volumes 1 and 2 of Ausubel et al. (1994) Current Protocols in Molecular Biology, Current Protocols, USA. Standard materials and methods for plant molecular work are described in Plant Molecular Biology Labfax (1993) by R. D. D. Croy, jointly published by BIOS Scientific Publications Ltd (UK) and Blackwell Scientific Publications, UK.

Standard breeding methods are described in 'Principles of Plant breeding', Second Edition, Robert W. Allard (ISBN 0-471-02309-4).

EXAMPLES

Example 1

Disease Resistance Test

Plants are grown in a mix of peat and vermiculite (ratio 5:1) in growth chamber until cotyledons to first leaf stages (15 days after sowing) at 25-20° C. with 70% of humidity, 16/8 h light/dark cycle. For each genotype 12 plants are inoculated (two plots of 6 plants each replicated and fully randomized). To check inoculation and screening quality six sensitive checks are included every 90 plants. Three plants per genotype are used as mock.

For ToBFRV inoculum preparation, leaves infected with ToBFRV as described in WO2017/012951 A1 and which are maintained at −80° C. as frozen leaves were taken from stock. 10 g of frozen ToBFRV infected leaves were grinded with 100 ml of Phosphate buffer 0.03M plus protectors (EDTA 1 ml/100 ml, Diethyl carbamic acid (DECA) 1 ml/100 ml, Sodium thioglycolate 1 ml/100 ml). The leaf surface was covered with Celite powder. A cotton swab was dipped in the plant sap (full of ToBFRV particles) and was gently rubbed on the leaves. This procedure was repeated for all the leaves. The sap was let to dry on the leaf surface and the plants were subsequently washed with tap water. The inoculated tomato plants were incubated in a growth chamber at 25°-20° C. with 16/8 h light/dark cycle. After 3/4 days post inoculation, the plants were provided with iron (1 g/L). One week later 20-20-20 fertilizers (nitrogen (20%), phosphorous (20%) and potassium (20%) (1 g/L) was used. This fertilizer was applied twice, spaced one week apart.

The inoculated plants are ready for evaluation 15 days after the inoculation. Typically, two evaluations are sufficient, wherein the second evaluation is performed two weeks after the first evaluation. Each plant is checked for the presence of symptoms of ToBFRV infection.

Scoring of the individual plants was realized using a scale from 1-9, where 1 stands for severe mosaic and leaf distortion/deformation and 9 stands for complete absence of symptoms (symptomless).

TABLE 1

| ToBFRV resistance classification | |
|---|---|
| Resistance level | Description |
| 1 | Severe mosaic and leaf distortion/deformation |
| 2 | Leaf distortion and deformation |
| 3 | More severe mosaic |
| 4 | Mild mosaic and leaf rolling/distortion |
| 6 | Presence of mild mosaic |
| 9 | Symptomles |

Results of the disease resistance test of SOURCE01 based on visual evaluation and ToBFRV resistance classification according to Table 1 are provided in FIG. 1. The fully susceptible tomato variety "Bonny Best" is used as a positive control. Tomato plants that were not inoculated with the ToBFRV inoculate were used as negative control.

In addition to ToBFRV resistance testing based on a visual evaluation of the individual plants, ToBFRV resistance may be tested using an ELISA assay. The ELISA assay was carried out using the Tobacco Mosaic Virus ELISA Complete Kit (PSA 57400/0288) of Agdia, Inc. according to manufactures instructions. In short, this test uses a 96-well microtiter plate coated with an antibody that detects a number of viruses (but not all) from the tobamovirus group. Tissue samples (e.g. leaf tissue, seeds, etc.) are ground in extraction buffer and diluted. The samples are then loaded into the microtiter wells, together with the provided controls (positive control, negative control and buffer only) and incubated. After incubation the plates are washed and freshly prepared alkaline phosphatase enzyme conjugate is dispensed into the wells, which are then incubated again. The plates are washed again and PNP substrate is added to each well, which are then incubated again. The results are examined by eye and/or using a plate reader at 405 nm. Coloured wells are positive for virus. Test results are only valid if the positive controls are coloured and the negative control is virtually clear and buffer-only wells are colourless. Results of the disease resistance test based on the ELISA assay of SOURCE01, the fully susceptible positive control variety "Bonny Best" and a non-inoculated negative control are provided in FIG. 1.

Furthermore, ToBFRV resistance testing may be based on a RT-PCT assay. The RT-PCT assay was carried out using the method as described in the document "Detection of Infectious Tomato brown rugose fruit virus (ToBRFV) in Tomato and Pepper Seed (version 1.4, March 2020)" as published by the International Seed Federation, using the primers CaTa28 and CSP1325 as described therein on page 4. Results of the disease resistance test based on the RT-PCR assay of SOURCE01, the fully susceptible positive control variety "Bonny Best" and a non-inoculated negative control are provided in FIG. 1.

Example 2

QTL Mapping of SOURCE01 Leading to the Identification of the Rug-1 Resistance Gene Three populations were developed, with SOURCE01 as donor and three elite lines. The deposited line PAR02001 is obtained by a cross of SOURCE01 with one of the sensitive elite lines used for the mapping populations.

300 plants of each of these populations were tested with ToBRFV in a climate chamber. Inoculations of the plants were done 14 days after sowing. First reading is done at 14 dpi (days post inoculation), second reading is done at 28 dpi, third is done at 36 dpi and an ELISA test is being done at 36-40 dpi.

The mapping was done on each of the population individually and for each dpi reading. For each population a set of a minimum 100 marker was selected and run on each of the 300 F2 individuals. Monomorphic markers were discarded, and a genetic linkage map was calculated for each population independently using the Maximum Likelihood mapping function in the JoinMap software package. The resulting maps were used in combination with the results from evaluation 1, evaluation 2 and evaluation 3 to identify quantitative trait loci (QTL) using the Hailey-Knott regression method as well as the multiple imputation method from R/QTL software package. Because the QTLs found in all populations were located on the same positions, the data of all populations were combined. The Hailey-Knott regression method as well as the multiple imputation method from R/QTL software package were used again to identify quantitative trait loci (QTL). The mapping was repeated on this dataset for a more powerful result. Two QTLs were found on chromosome 2 and chromosome 11 with high LOD values. These two QTLs were found in all dpi readings, with different LOD scores; see FIG. 2.

The remaining intervals for each mapping population and the combined population dataset are shown in FIG. 3. The markers present in the 99% confidence interval (LOD 3 drop) are underlined. The remaining physical interval for evaluation 3 and the combined dataset is 28.7 Mbps. Extra markers did not decrease this interval, so recombination fine mapping was initiated. The results of this fine mapping is shown in FIG. 3.

From data provided in FIG. 3 it can be further concluded that the resistance-conferring interval still overlaps with the *Solanum* habrochaites introgression on which the known Tm-1 resistance gene is located. Since the Tm-1 resistance gene was cloned and its sequence published, we could compare this with the Tm-1 allele of SOURCE01. The results of this comparison are shown in FIG. 4.

From FIG. 4 it can be concluded that SOURCE01 is highly similar to the resistant Tm-1 allele from GCR237, sharing all the SNPs but in heterozygous form (see FIG. 3, example marked as mTO268402325). In addition to this, additional variation was found (example marked as SOURCE01 [A/G]), also in heterozygous form.

Markers were designed on both type of SNPs and tested on SOURCE01 seeds. The results obtained with these markers is shown in FIG. 4. F2 data is added to the data shown in FIG. 5 to improve the cluster plot due to skewness.

From FIG. 5 it can be concluded that SOURCE01 is heterozygous for this marker in WGRS data, however when ordered and screened was found to be homozygous instead. This result was not as expected, because all SOURCE01 seeds had the homozygous Tm-1 allele. This conflicted with the heterozygous call from WGRS data. WGRS data of SOURCE01 also showed that twice the number of reads were present in the Tm-1 gene. Based on this information in combination with the skewed plots, it was suspected that SOURCE01 has a paralog of the Tm-1 gene which is called Rug-1.

To prove this hypothesis, droplet PCR primers were designed for the Tm-1 gene, the Rug-1 gene and internal housekeeping genes Fw2.2 and Sp. These latter two genes were chosen, because no duplication events in these genes are expected.

An overview of the expected results from the droplet PCR are provided in FIG. 6.

Example 3

Characterization of the Rug-1 Resistance Gene

The Rug-1 gene was found to encode a protein with unique amino acids at the virus binding side. An alignment between the amino acid sequences of RUG1 and TM1 is provided in FIG. 7.

Ishibash et al. (2012) PLOS Pathogens 8(10) e1002975) describe that a small region corresponding to residues 79-112 of the dominant resistance gene Tm-1 has been under positive selection in *S. habrochaites*. The sequence of this domain in the TM-1 protein from SOURCE01, is presumed to be required for ToMV1 resistance and is identical to that that region of the well-known TM-1 source *S. habrochaites* accession PI126445-6 (Ishibash et al., 2012).

SOURCE01 contains besides the Tm-1 resistance gene the paralogous Rug-1 resistance gene, which is comparable but not identical to the Tm-1 resistance gene from ToMV1 sensitive *S. habrochaites* accessions. The corresponding domain in the RUG 1 protein is, however, comparable to that of the TM-1 amino acid sequence of ToMV1 sensitive *S. habrochaites* accessions. There is also a number of residues that are specific for the RUG-1 protein compared to other known TM-1 amino acid sequences in the SGN/NCBI database: Q29, Y30, A259, E379, L394, V428 and K624. The effects of the specific amino acid residues could be responsible for specific structural features that enhances this protein's binding affinity to ToBRFV replication proteins and decrease virus propagation.

The invention claimed is:

1. A hybrid *Solanum lycopersicum* plant comprising in its genome at least one copy of the Rug-1 resistance gene, wherein the Rug-1 resistance gene confers a Tomato Brown Rugose Fruit Virus (ToBRFV) tolerance/resistance phenotype, and wherein the Rug-1 resistance gene encodes a protein comprising at least 99.7% amino acid sequence identity to SEQ ID NO: 16,
wherein said plant further comprises Quantitative Trait Locus QTL11 on chromosome 11 located between SEQ ID NO: 1 and SEQ ID NO: 13, and wherein said QTL11 is capable of conferring a Tomato Brown Rugose Fruit Virus (ToBRFV) tolerance/resistance phenotype when present in homozygous form.

2. The hybrid *Solanum lycopersicum* plant of claim 1, wherein the Rug-1 resistance gene is present in homozygous form.

3. The hybrid *Solanum lycopersicum* plant of claim 1, wherein the Rug-1 resistance gene is as present in, or as obtainable from, or as obtained from, or as comprised in the genome of a *Solanum lycopersicum* plant designated PAR02001 of which a representative number of seeds have been deposited under deposit number NCIMB 43590.

4. The hybrid *Solanum lycopersicum* plant of claim 1, wherein QTL11 is comprised in an introgression fragment, and wherein said introgression fragment comprising QTL11 comprises a haplotype of one or more SNP markers selected from:
an adenine for SNP_01 at nucleotide 51 of SEQ ID NO: 1 or at nucleotide 51 of a sequence comprising at least 97% sequence identity to SEQ ID NO: 1;
an adenine for SNP_02 at nucleotide 51 of SEQ ID NO: 2 or at nucleotide 51 of a sequence comprising at least 97% sequence identity to SEQ ID NO: 2;
a guanine for SNP_03 at nucleotide 51 of SEQ ID NO: 3 or at nucleotide 51 of a sequence comprising at least 97% sequence identity to SEQ ID NO: 3;
an adenine for SNP_04 at nucleotide 51 of SEQ ID NO: 4 or at nucleotide 51 of a sequence comprising at least 97% sequence identity to SEQ ID NO: 4;
an adenine for SNP_05 at nucleotide 51 of SEQ ID NO: 5 or at nucleotide 51 of a sequence comprising at least 97% sequence identity to SEQ ID NO: 5;
a guanine for SNP_06 at nucleotide 51 of SEQ ID NO: 6 or at nucleotide 51 of a sequence comprising at least 97% sequence identity to SEQ ID NO: 6;
a guanine for SNP_07 at nucleotide 51 of SEQ ID NO: 7 or at nucleotide 51 of a sequence comprising at least 97% sequence identity to SEQ ID NO: 7;
an adenine for SNP_08 at nucleotide 51 of SEQ ID NO: 8 or at nucleotide 51 of a sequence comprising at least 97% sequence identity to SEQ ID NO: 8;
a thymine for SNP_09 at nucleotide 51 of SEQ ID NO: 9 or at nucleotide 51 of a sequence comprising at least 97% sequence identity to SEQ ID NO: 9;
a thymine for SNP_10 at nucleotide 51 of SEQ ID NO: 10 or at nucleotide 51 of a sequence comprising at least 97% sequence identity to SEQ ID NO: 10;
an adenine for SNP_11 at nucleotide 51 of SEQ ID NO: 11 or at nucleotide 51 of a sequence comprising at least 97% sequence identity to SEQ ID NO: 11;
a thymine for SNP_12 at nucleotide 51 of SEQ ID NO: 12 or at nucleotide 51 of a sequence comprising at least 97% sequence identity to SEQ ID NO: 12;
a thymine for SNP_13 at nucleotide 51 of SEQ ID NO: 13 or at nucleotide 51 of a sequence comprising at least 97% sequence identity to SEQ ID NO: 13;
a cytosine for SNP_14 at nucleotide 51 of SEQ ID NO: 14 or at nucleotide 51 of a sequence comprising at least 97% sequence identity to SEQ ID NO: 14; and/or
a thymine for SNP_15 at nucleotide 51 of SEQ ID NO: 15 or at nucleotide 51 of a sequence comprising at least 97% sequence identity to SEQ ID NO: 15.

5. The hybrid *Solanum lycopersicum* plant according to claim 4, wherein QTL11 is present in homozygous form.

6. The hybrid *Solanum lycopersicum* plant according to claim 4, wherein QTL11 is as present in, or as obtainable from, or as obtained from, or as comprised in the genome of a *Solanum lycopersicum* plant designated PAR02001 of which a representative number of seeds have been deposited under deposit number NCIMB 43590.

7. The hybrid *Solanum lycopersicum* plant of claim 1, wherein said plant further comprises the Tm-1 resistance gene.

8. The hybrid *Solanum lycopersicum* plant according to claim 1, wherein the plant is a single cross F1 hybrid.

9. Seed produced by the hybrid *Solanum lycopersicum* plant according to claim 1, wherein the seed comprises the Rug-1 resistance gene as defined in claim 1.

10. A seed from which the hybrid *Solanum lycopersicum* plant according to claim 1 can be grown.

11. A plant cell, tissue or plant part of a hybrid *Solanum lycopersicum* plant comprising in its genome at least one copy of the Rug-1 resistance gene, wherein the Rug-1 resistance gene confers a Tomato Brown Rugose Fruit Virus (ToBRFV) tolerance/resistance phenotype, and wherein the Rug-1 resistance gene encodes a protein comprising at least 99.7% amino acid sequence identity to SEQ ID NO: 16,
wherein said plant cell, tissue or plant part further comprises Quantitative Trait Locus QTL11 on chromosome 11 located between SEQ ID NO: 1 and SEQ ID NO: 13, and wherein said QTL11 is capable of conferring a Tomato Brown Rugose Fruit Virus (ToBRFV) tolerance/resistance phenotype when present in homozygous form.

12. A haploid plant or dihaploid plant derived from the hybrid plant according to claim 1, wherein the haploid or dihaploid plant comprises the Rug-1 resistance gene and the Quantitative Trait Locus QTL11 on chromosome 11 located between SEQ ID NO: 1 and SEQ ID NO: 13.

13. A method for producing a *Solanum lycopersicum* plant having a Tomato Brown Rugose Fruit Virus (ToBRFV) tolerance/resistance phenotype, said method comprising the step(s) of:
  (i) crossing a first *Solanum lycopersicum* plant and a second plant, wherein the first *Solanum Lycopersicum* plant comprises in its genome the Rug-1 resistance gene as defined in claim 1; and
  (ii) optionally harvesting seed from the crossing of (1) and selecting seed comprising Rug-1 resistance gene in its genome.

14. A method for enhancing the Tomato Brown Rugose Fruit Virus (ToBRFV) tolerance/resistance phenotype of a *Solanum lycopersicum* plant, said method comprising introgressing Rug-1 resistance gene as defined in claim 1 into said *Solanum lycopersicum* plant.

* * * * *

```
                        SEQUENCE LISTING

<160> NUMBER OF SEQ ID NOS: 26

<210> SEQ ID NO 1
<211> LENGTH: 101
<212> TYPE: DNA
<213> ORGANISM: Solanum lycopersicum

<400> SEQUENCE: 1
atcttaattt gaaatattta taagagagca tatcttatat cttatatgta atcaaaggaa      60
aataaatgtc agaagatgtt tgtgatctct tatataacaa g                        101

<210> SEQ ID NO 2
<211> LENGTH: 101
<212> TYPE: DNA
<213> ORGANISM: Solanum lycopersicum

<400> SEQUENCE: 2
ggcacaaatc ccacagcagt ggcacctttt gaaccagtga gctttatctt aaaaaattgt      60
aaagttccta taattcaatc cttgtatagt ctactacagc g                        101

<210> SEQ ID NO 3
<211> LENGTH: 105
<212> TYPE: DNA
<213> ORGANISM: Solanum lycopersicum

<400> SEQUENCE: 3
atagacaact tgcttaagtc atcaacaacc atattagtct tacctaggtg gcaaagaatg      60
ctcatgtcat aatgcttgag caattctaac catctccttt atgta                    105

<210> SEQ ID NO 4
<211> LENGTH: 101
<212> TYPE: DNA
<213> ORGANISM: Solanum lycopersicum

<400> SEQUENCE: 4
ctacttgagt tctacaatcg actgaggaat aacaggcatg aagccagttg ataccagtat      60
gacatcaaag tctaccatgt ctaactcaat taaatcgatc a                        101

<210> SEQ ID NO 5
<211> LENGTH: 101
<212> TYPE: DNA
<213> ORGANISM: Solanum lycopersicum

<400> SEQUENCE: 5
gtttttttat gtgaggtgat ctttaatttt tgtcattaaa tatgtgtcgc agtctaaccc      60
actgagtcgt gcaggcagct attctaacgg ctaagtagga g                        101

<210> SEQ ID NO 6
<211> LENGTH: 101
<212> TYPE: DNA
<213> ORGANISM: Solanum lycopersicum

<400> SEQUENCE: 6
tcggggatct agtctacaca ggaataagag ctactaagag tacaaggtat gacaaaaata      60
```
taagtgacgc aactcctacc atgcgaaagg aaaagtagaa g    101

<210> SEQ ID NO 7
<211> LENGTH: 101
<212> TYPE: DNA
<213> ORGANISM: Solanum lycopersicum

<400> SEQUENCE: 7
ctagtcatgc acagagttat ggtcagtagg aagtccaaca agtgtaagaa ggcctttgct    60
cttgttgctt ttccacgttt gtagtgatag gcatcaacgt t    101

<210> SEQ ID NO 8
<211> LENGTH: 101
<212> TYPE: DNA
<213> ORGANISM: Solanum lycopersicum

<400> SEQUENCE: 8
cagaaataat agaaaatcag aagaaaaat cagctttcta aatggaaaag acgatggcac    60
tatgtttgaa gttttaagca acttttctga agtcccaaaa g    101

<210> SEQ ID NO 9
<211> LENGTH: 101
<212> TYPE: DNA
<213> ORGANISM: Solanum lycopersicum

<400> SEQUENCE: 9
aaggaagctg ggtatttagt tgttaggtta atcctagttt cattgtaacc tgctgtccgc    60
cgataccaac caccacccca tcatgtccgt tcagagattc t    101

<210> SEQ ID NO 10
<211> LENGTH: 101
<212> TYPE: DNA
<213> ORGANISM: Solanum lycopersicum

<400> SEQUENCE: 10
agtcggaaaa gggttccagt gtagtgtcta taaatagggt cttaatttaa taatttatat    60
actcaattta ataatattct tcacatatat ttctcacacc a    101

<210> SEQ ID NO 11
<211> LENGTH: 101
<212> TYPE: DNA
<213> ORGANISM: Solanum lycopersicum

<400> SEQUENCE: 11
aatttagttt caggagattc aatgtttaca aaatcattgc aagatacttc aatctgaaac    60
ttctcagtct aatcagacac atttcactca tattttctca a    101

<210> SEQ ID NO 12
<211> LENGTH: 101
<212> TYPE: DNA
<213> ORGANISM: Solanum lycopersicum

<400> SEQUENCE: 12
gttaggatgc gatatatgta ctattaattg tttatgtgtt acgttgctat taatgaggat    60
atcgtaaatc cactcctatc cagaaatttc cagaagatat a    101

<210> SEQ ID NO 13
<211> LENGTH: 101
<212> TYPE: DNA
<213> ORGANISM: Solanum lycopersicum -continued

<400> SEQUENCE: 13
actctaaatc attgaccatc ttaatgtggt tcgaaaccac catcttagat tgatcgtggg    60
caagcaacaa agaatggacg aacaaactat ggagcacttc a                       101

<210> SEQ ID NO 14
<211> LENGTH: 101
<212> TYPE: DNA
<213> ORGANISM: Solanum lycopersicum

<400> SEQUENCE: 14
ccagtgttac tgatgcgaga tttggcatta aagatacgat agaattaagc cttaaaagcc    60
aaggtggaaa aatggttttt tttttgcaga ttgatttcca t                       101

<210> SEQ ID NO 15
<211> LENGTH: 101
<212> TYPE: DNA
<213> ORGANISM: Solanum lycopersicum

<400> SEQUENCE: 15
ttaaatcaca actcttcata aaagtcgcaa ctcttcattt tccattcaca tcttttagaa    60
ccaacaatct cccacatgaa tggggaatga cttcaagaca a                       101

<210> SEQ ID NO 16
<211> LENGTH: 754
<212> TYPE: PRT
<213> ORGANISM: Solanum lycopersicum

<400> SEQUENCE: 16

Met Ala Ser Ala Gln Ser Asn Ser Pro Arg Val Phe Cys Ile Gly Thr
1               5                   10                  15

Ala Asp Thr Lys Phe Asp Glu Leu Arg Phe Leu Ser Gln Tyr Val Arg
            20                  25                  30

Ser Ser Leu Asn Ser Phe Ser Asn Lys Ser Ser Phe Lys Val Gly Val
        35                  40                  45

Thr Val Val Asp Val Ser Thr Ser Leu Lys Glu Thr Asn Gly Cys Ala
    50                  55                  60

Asp Phe Asp Phe Val Pro Arg Lys Asp Val Leu Ser Cys Tyr Ala Gln
65                  70                  75                  80

Gly Gly Glu Ser Val Val Gln Leu Pro Asp Asp Arg Gly Gln Ala Ile
                85                  90                  95

Ala Ile Met Asn Lys Ala Phe Gln Thr Phe Leu Ser Lys Ala Asn Gly
            100                 105                 110

Glu Gln Asn Leu Ala Gly Val Ile Gly Leu Gly Gly Ser Gly Gly Thr
        115                 120                 125

Ser Leu Leu Ser Ser Ala Phe Arg Ser Leu Pro Ile Gly Ile Pro Lys
    130                 135                 140

Val Ile Ile Ser Thr Val Ala Ser Gly Gln Thr Glu Ser Tyr Ile Gly
145                 150                 155                 160

Thr Ser Asp Leu Val Leu Phe Pro Ser Val Val Asp Ile Cys Gly Ile
                165                 170                 175

Asn Asn Val Ser Lys Val Ile Leu Ser Asn Ala Gly Ala Ala Phe Ala
            180                 185                 190

Gly Met Val Ile Gly Arg Leu Glu Thr Ser Lys Glu Asn Ser Ile Thr
        195                 200                 205

Thr Gly Lys Phe Thr Val Gly Val Thr Met Phe Gly Val Thr Thr Pro

-continued

```
              210                 215                 220
Cys Val Asn Ala Val Lys Glu Arg Leu Val Lys Glu Gly Tyr Glu Thr
225                 230                 235                 240

Leu Val Phe His Ala Thr Gly Val Gly Gly Arg Ala Met Glu Asp Leu
                245                 250                 255

Val Arg Ala Gly Phe Ile Gln Gly Val Leu Asp Ile Thr Thr Thr Glu
                260                 265                 270

Val Ala Asp Tyr Val Val Gly Gly Val Met Ala Cys Asp Ser Ser Arg
            275                 280                 285

Phe Asp Ala Ile Leu Glu Lys Lys Ile Pro Leu Val Leu Ser Val Gly
        290                 295                 300

Ala Leu Asp Met Val Asn Phe Gly Pro Lys Thr Thr Ile Pro Pro Glu
305                 310                 315                 320

Phe Gln Gln Arg Lys Ile His Gln His Asn Glu Gln Val Ser Ile Met
                325                 330                 335

Arg Thr Thr Val Gly Glu Asn Lys Lys Phe Ala Ala Phe Ile Ala Glu
                340                 345                 350

Lys Leu Asn Lys Ala Ser Ser Ser Val Cys Val Cys Leu Pro Glu Lys
            355                 360                 365

Gly Val Ser Ala Leu Asp Ala Pro Gly Lys Glu Phe Tyr Asp Pro Glu
        370                 375                 380

Ala Thr Ser Cys Leu Thr His Glu Leu Leu Met Leu Leu Glu Asn Asn
385                 390                 395                 400

Glu Arg Cys Gln Val Lys Val Phe Pro Cys His Ile Asn Asp Ala Glu
                405                 410                 415

Phe Ala Asn Ala Leu Val Asp Ser Phe Leu Glu Val Ser Pro Lys Ser
                420                 425                 430

Arg His Val Glu Cys Gln Pro Ala Glu Ser Lys Cys Ile Gln Asp Ile
            435                 440                 445

Gln Asn Asp Asn Ala Val Leu Glu Lys Tyr Pro Ser Cys Asn Gly Lys
        450                 455                 460

Asn Phe Ser Arg Leu Asn Asp Phe Pro Asn Ala Lys Pro Glu Thr Leu
465                 470                 475                 480

Gln Lys Arg Thr Val Ile Leu Gln Lys Leu Lys Asp Gln Ile Ser Lys
                485                 490                 495

Gly Lys Pro Ile Ile Gly Ala Gly Ala Gly Thr Gly Ile Ser Ala Lys
            500                 505                 510

Phe Glu Glu Ala Gly Gly Val Asp Leu Ile Val Leu Tyr Asn Ser Gly
        515                 520                 525

Arg Phe Arg Met Ala Gly Arg Gly Ser Leu Ala Gly Leu Leu Pro Phe
        530                 535                 540

Ala Asp Ala Asn Ala Ile Val Leu Glu Met Ala Asn Glu Val Leu Pro
545                 550                 555                 560

Val Val Lys Glu Val Ala Val Leu Ala Gly Val Cys Ala Thr Asp Pro
                565                 570                 575

Phe Arg Arg Met Asp Asn Phe Leu Lys Gln Leu Glu Ser Val Gly Phe
                580                 585                 590

Cys Gly Val Gln Asn Phe Pro Thr Val Gly Leu Phe Asp Gly Asn Phe
            595                 600                 605

Arg Gln Asn Leu Glu Glu Thr Gly Met Gly Tyr Gly Leu Glu Val Lys
        610                 615                 620

Met Ile Ala Thr Ala His Arg Met Gly Leu Leu Thr Thr Pro Tyr Ala
625                 630                 635                 640
```

```
Phe Cys Pro Asp Glu Ala Val Ala Met Ala Glu Ala Gly Ala Asp Ile
            645                 650                 655

Ile Val Ala His Met Gly Leu Thr Thr Ser Gly Ser Ile Gly Ala Lys
            660                 665                 670

Thr Ala Val Ser Leu Glu Glu Ser Val Thr Cys Val Gln Ala Ile Ala
            675                 680                 685

Asp Ala Thr His Arg Ile Asn Pro Asp Ala Ile Val Leu Cys His Gly
            690                 695                 700

Gly Pro Ile Ser Ser Pro Glu Glu Ala Ala Tyr Val Leu Lys Arg Thr
705                 710                 715                 720

Thr Gly Val His Gly Phe Tyr Gly Ala Ser Ser Met Glu Arg Leu Pro
                725                 730                 735

Val Glu Gln Ala Ile Thr Ala Thr Val Gln Gln Tyr Lys Ser Ile Ser
            740                 745                 750

Met Glu
```

<210> SEQ ID NO 17
<211> LENGTH: 2265
<212> TYPE: DNA
<213> ORGANISM: Solanum lycopersicum

<400> SEQUENCE: 17

| | | | | | |
|---|---|---|---|---|---|
| atggcaagtg | cacagagtaa | ttctcctcga | gttttctgta | ttggaacagc | tgatactaaa | 60 |
| ttcgacgagc | ttcgtttcct | ctcccaatat | gtgagatcca | gtcttaacag | cttctccaat | 120 |
| aaatcctcat | tcaaggtcgg | agtcacagtt | gttgatgtct | caaccagcct | aaaggagaca | 180 |
| aatggttgtg | ctgattttga | ttttgtgccg | aggaaggatg | tgctgtcctg | ctatgcacaa | 240 |
| ggggagaat | ctgtggtcca | gcttccagat | gatagaggcc | aagctattgc | aatcatgaac | 300 |
| aaagcttttc | aaactttcct | aagcaaagct | aatggtgaac | agaatcttgc | tggagtgatt | 360 |
| ggccttgggg | gtagtggagg | aacatctcta | ttgtcatctg | ccttccgatc | tcttccaatt | 420 |
| ggaatcccaa | agttataat | atctacagtt | gccagtggtc | aaactgaatc | ttatattgga | 480 |
| acatcagact | tggtattgtt | tccttcagtt | gtagatattt | gtgggattaa | caatgttagt | 540 |
| aaggttattc | tatctaatgc | gggtgcagca | tttgctggaa | tggtgatcgg | aaggcttgaa | 600 |
| acttcaaaag | agaatagcat | cactactgga | agtttacag | ttggtgtaac | tatgtttggg | 660 |
| gttacgactc | cttgtgttaa | tgctgtcaaa | gaaagattag | tgaaagaagg | atatgagact | 720 |
| ttggttttcc | atgccacggg | tgtcgggggc | agggccatgg | aggatcttgt | tagagcaggt | 780 |
| tttatacagg | gcgtgctgga | tattacgaca | actgaggttg | cagattacgt | agttggagga | 840 |
| gtaatggcat | gtgatagttc | ccgatttgat | gcaatattag | agaagaaaat | tcctttggtt | 900 |
| ctgagtgtgg | agcactgga | tatggtgaat | tttggtccta | aaactaccat | accacctgag | 960 |
| tttcagcaaa | gaaagattca | tcaacataat | gagcaggttt | ccataatgcg | tactacagta | 1020 |
| ggtgaaaata | gaaatttgc | tgcatttata | gctgaaaagt | tgaacaaggc | atcatcaagt | 1080 |
| gtatgtgttt | gcttgccaga | gaaaggtgtg | tctgcattgg | atgcaccggg | gaagaattt | 1140 |
| tatgatcctg | aggcaactag | ttgtcttaca | catgagctac | tgatgcttct | tgaaaacaat | 1200 |
| gaacgttgtc | aggttaaggt | cttcccttgc | catatcaatg | atgcggagtt | tgcaaatgct | 1260 |
| ttagttgatt | cattcttgga | agtctctccg | aaatctagac | acgtagaatg | tcagccagct | 1320 |
| gagtccaaat | gtatccaaga | cattcagaat | gataatgctg | ttctagagaa | atatccctca | 1380 |
| tgcaacggga | aaactttttc | tcgcctgaat | gactttccaa | atgcaaaacc | agaaactttg | 1440 |

```
cagaaaagaa ctgtgatact gcagaaattg aaagatcaaa taagtaaggg caagcctatt    1500
attggggctg gagctggtac aggtatttct gctaagtttg aggaagctgg tggtgtggat    1560
ttgattgtct tgtacaactc agggcgcttt aggatggcag aaggggatc cttagctggt     1620 ctattgccct tgctgatgc aaatgccatt gtacttgaga tggccaacga agtattgccg     1680
gtggttaagg aagtggcagt tctggctgga gtttgtgcaa ctgatccttt ccgcaggatg    1740
gacaacttcc tgaagcagtt ggaatccgtt ggattctgtg gggtgcaaaa ctttccaact    1800
gttggtctgt ttgacggtaa cttcagacaa aatttggaag agactggaat gggttatggc    1860
ttggaggtta agatgattgc aacagctcac aggatgggcc ttttgacaac cccatatgct    1920
ttctgcccag atgaagcagt tgctatggca gaagctggtg ccgacatcat agttgctcat    1980
atggggctta caacatctgg ttcaattggt gcaaaaacag ctgtctcatt ggaggaaagt    2040
gtaacttgcg tccaagctat tgcagatgct actcatagga taaatcctga tgcaattgtg    2100
ctctgccatg gaggccctat atcttcccct gaagaagcag catatgtact gaagagaacc    2160
acaggagttc atggatttta tggcgcttca agcatggaaa gactaccagt tgagcaagct    2220
ataactgcaa ctgtccagca gtacaagtct atttctatgg agtga                   2265

<210> SEQ ID NO 18
<211> LENGTH: 101
<212> TYPE: DNA
<213> ORGANISM: Solanum lycopersicum

<400> SEQUENCE: 18
actcctccaa ctacgtaatc tgcaacctca gttgtcgtaa tatccagcac gccctaaaat    60
aagttcagta acaggtgagt attaagcgtt atccagaaat a                       101

<210> SEQ ID NO 19
<211> LENGTH: 101
<212> TYPE: DNA
<213> ORGANISM: Solanum lycopersicum

<400> SEQUENCE: 19
tgaatcacct gctcattatg ttgatgaatc tttctttgct gaaactcagg tggtatggta    60
gttttaggac caaaattcac catatccagt gctcccacac t                       101

<210> SEQ ID NO 20
<211> LENGTH: 101
<212> TYPE: DNA
<213> ORGANISM: Solanum lycopersicum

<400> SEQUENCE: 20
taagattcag tttgaccact ggcaactgta gatattataa cttttgggat tccaattgga    60
agagatcgga aggcagatga caatagagat gttcctccac t                       101

<210> SEQ ID NO 21
<211> LENGTH: 754
<212> TYPE: PRT
<213> ORGANISM: Solanum lycopersicum

<400> SEQUENCE: 21

Met Ala Thr Ala Gln Ser Asn Ser Pro Arg Val Phe Cys Ile Gly Thr
1               5                   10                  15

Ala Asp Thr Lys Phe Asp Glu Leu Arg Phe Leu Ser Glu His Val Arg
            20                  25                  30
```

```
Ser Ser Leu Asn Ser Phe Ser Asn Lys Ser Ser Phe Lys Val Gly Val
         35                  40                  45

Thr Val Val Asp Val Ser Thr Ser Trp Lys Glu Thr Asn Ser Cys Ala
 50                  55                  60

Asp Phe Asp Phe Val Pro Ser Lys Asp Val Leu Ser Cys His Thr Leu
 65                  70                  75                  80

Gly Glu Glu Thr Met Gly Thr Phe Ala Asp Thr Arg Gly Leu Ala Ile
                 85                  90                  95

Ala Ile Met Ser Lys Ala Leu Glu Thr Phe Leu Ser Ile Ala Asn Asp
             100                 105                 110

Glu Gln Asn Leu Ala Gly Val Ile Gly Leu Gly Gly Ser Gly Gly Thr
         115                 120                 125

Ser Leu Leu Ser Ser Ala Phe Arg Ser Leu Pro Ile Gly Ile Pro Lys
     130                 135                 140

Val Ile Ile Ser Thr Val Ala Ser Gly Gln Thr Glu Ser Tyr Ile Gly
145                 150                 155                 160

Thr Ser Asp Leu Val Leu Phe Pro Ser Val Val Asp Ile Cys Gly Ile
                 165                 170                 175

Asn Asn Val Ser Lys Val Val Leu Ser Asn Ala Gly Ala Ala Phe Ala
             180                 185                 190

Gly Met Val Ile Gly Arg Leu Glu Ser Ser Lys Glu His Ser Ile Thr
         195                 200                 205

Asn Gly Lys Phe Thr Val Gly Val Thr Met Phe Gly Val Thr Thr Pro
     210                 215                 220

Cys Val Asn Ala Val Lys Glu Arg Leu Val Lys Glu Gly Tyr Glu Thr
225                 230                 235                 240

Leu Val Phe His Ala Thr Gly Val Gly Gly Arg Ala Met Glu Asp Leu
                 245                 250                 255

Val Arg Gly Gly Phe Ile Gln Gly Val Leu Asp Ile Thr Thr Thr Glu
             260                 265                 270

Val Ala Asp Tyr Val Val Gly Gly Val Met Ala Cys Asp Ser Ser Arg
         275                 280                 285

Phe Asp Ala Ile Leu Glu Lys Lys Ile Pro Leu Val Leu Ser Val Gly
     290                 295                 300

Ala Leu Asp Met Val Asn Phe Gly Pro Lys Thr Thr Ile Pro Pro Glu
305                 310                 315                 320

Phe Gln Gln Arg Lys Ile His Glu His Asn Glu Gln Val Ser Leu Met
                 325                 330                 335

Arg Thr Val Gly Glu Asn Lys Lys Phe Ala Ala Phe Ile Ala Glu
             340                 345                 350

Lys Leu Asn Lys Ala Ser Ser Ser Val Cys Val Cys Leu Pro Glu Lys
         355                 360                 365

Gly Val Ser Ala Leu Asp Ala Pro Gly Lys Asp Phe Tyr Asp Pro Glu
     370                 375                 380

Ala Thr Ser Cys Leu Thr Arg Glu Leu Gln Met Leu Leu Glu Asn Asn
385                 390                 395                 400

Glu Arg Cys Gln Val Lys Val Leu Pro Tyr His Ile Asn Asp Ala Glu
                 405                 410                 415

Phe Ala Asn Ala Leu Val Asp Ser Phe Leu Glu Ile Ser Pro Lys Ser
             420                 425                 430

Arg His Val Glu Cys Gln Pro Ala Glu Ser Lys Ser Ile Gln Asp Ile
         435                 440                 445

Gln Asn Asp Asn Ala Val Leu Glu Lys Tyr Pro Ser Cys Asn Gly Lys
```

```
        450              455              460
Asn Phe Ser Arg Leu Asn Asp Phe Pro Asn Ala Lys Pro Glu Thr Leu
465                      470                  475                  480

Gln Lys Arg Thr Val Ile Leu Gln Lys Leu Lys Asp Gln Ile Ser Lys
                    485                  490                  495

Gly Lys Pro Ile Ile Gly Ala Gly Ala Gly Thr Gly Ile Ser Ala Lys
                500                  505                  510

Phe Glu Glu Ala Gly Gly Val Asp Leu Ile Val Leu Tyr Asn Ser Gly
            515                  520                  525

Arg Phe Arg Met Ala Gly Arg Gly Ser Leu Ala Gly Leu Leu Pro Phe
        530                  535                  540

Ala Asp Ala Asn Ala Ile Val Leu Glu Met Ala Asn Glu Val Leu Pro
545                  550                  555                  560

Val Val Lys Glu Val Ala Val Leu Ala Gly Val Cys Ala Thr Asp Pro
                565                  570                  575

Phe Arg Arg Met Asp Asn Phe Leu Lys Gln Leu Glu Ser Val Gly Phe
                580                  585                  590

Cys Gly Val Gln Asn Phe Pro Thr Val Gly Leu Phe Asp Gly Asn Phe
            595                  600                  605

Arg Gln Asn Leu Glu Glu Thr Gly Met Gly Tyr Gly Leu Glu Val Glu
        610                  615                  620

Met Ile Ala Ala Ala His Arg Met Gly Leu Leu Thr Thr Pro Tyr Ala
625                  630                  635                  640

Phe Cys Pro Asp Glu Ala Val Ala Met Ala Glu Ala Gly Ala Asp Ile
                645                  650                  655

Ile Val Ala His Met Gly Leu Thr Thr Ser Gly Ser Ile Gly Ala Lys
                660                  665                  670

Thr Ala Val Ser Leu Glu Glu Ser Val Thr Cys Val Gln Ala Ile Ala
            675                  680                  685

Asp Ala Thr His Arg Ile Tyr Pro Asp Ala Ile Val Leu Cys His Gly
        690                  695                  700

Gly Pro Ile Ser Ser Pro Glu Glu Ala Ala Tyr Val Leu Lys Arg Thr
705                  710                  715                  720

Thr Gly Val His Gly Phe Tyr Gly Ala Ser Ser Met Glu Arg Leu Pro
                725                  730                  735

Val Glu Gln Ala Ile Thr Ala Val Gln Gln Tyr Lys Ser Ile Ser
            740                  745                  750

Met Glu

<210> SEQ ID NO 22
<211> LENGTH: 2265
<212> TYPE: DNA
<213> ORGANISM: Solanum lycopersicum

<400> SEQUENCE: 22
atggcaactg cacagagtaa ttctcctcga gtttttctgta tcggaacagc tgatacaaaa      60
ttcgacgagc ttcgtttcct ctccgagcat gtgagatcca gtcttaacag cttttccaat     120
aaatcctcat tcaaggtagg agtgacagtt gttgatgtct caaccagctg aaggagaca     180 aatagttgtg ctgattttga ttttgtaccg agtaaggatg tgctgtcatg ccatacacta     240
ggggaagaaa ctatgggcac gtttgcagat actagaggcc tagctattgc aatcatgagc     300
aaagctcttg aaacttttcc taagtatagc taatgatgaac agaatcttgc tggagtaatt     360
ggccttgggg gtagtggagg aacatctcta ttgtcatctg ccttccgatc tcttccaatt     420
```

```
gggatcccaa aagttataat atctacagtt gccagtggtc aaactgaatc ttatattgga      480
acatcagact tggtattgtt tccttcagtt gtagatattt gtgggattaa caatgtcagt      540
aaggttgttc tatctaatgc gggtgcagca tttgctggaa tggtgattgg gaggcttgaa      600
agttcaaaag agcatagcat cactaatgga aagtttacag ttggtgtaac tatgtttggg      660
gttacgactc cttgtgttaa tgctgtcaaa gaaagattag tgaagaagg atatgagact       720 ttggtgttcc atgccacggg tgtcgggggc agggccatgg aggatcttgt tagaggaggt      780
tttatacagg gtgtgctgga tattacgaca actgaggttg cagattacgt agttggagga     840
gtaatggcat gtgatagttc ccgatttgat gcaatattag agaagaaaat tcctttggtt     900
ctgagtgtgg gagcactgga tatggtgaat tttggtccta aaactaccat acctcctgag    960
tttcaacaaa gaaagatcca tgaacataat gagcaggttt ccctaatgcg tactacagta   1020
ggtgaaaata gaaatttgc tgcatttata gcagaaaagt tgaacaaggc atcatcaagt     1080
gtatgtgttt gcttgccaga gaaaggcgtg tctgcattgg atgcacccgg aaaagacttt   1140
tatgatcctg aggcaactag ttgtcttaca cgtgaactac agatgcttct tgaaaataat    1200
gaacgttgtc aggttaaggt cctcccttac catatcaatg atgcggagtt tgcaaatgct   1260
ttagttgatt cattcttgga aatctctccg aaatctagac acgtagaatg tcagccagct   1320
gagtccaaat ctatccaaga cattcagaat gataatgctg ttctagagaa atatccctca   1380
tgcaacggga aaaactttc tcgcctgaat gactttccaa atgcaaaacc agaaactttg    1440
cagaaaagaa ctgtgatact gcagaaattg aaagatcaaa taagtaaggg caagcctatt    1500
attggggctg gtgctggtac aggtatttct gctaagtttg aggaagctgg tggtgtagat    1560
ttgattgtct tgtacaactc agggcgcttt aggatggcag gaaggggatc cttagctggt    1620
ctattgccct ttgctgatgc aaatgccatt gtacttgaga tggccaacga agtattgcct    1680
gtggttaagg aagtggcagt tctggctgga gtttgtgcaa ctgatccttt ccgcaggatg    1740
gacaacttcc tgaagcagtt ggaatccgtt ggattctgtg gggtgcaaaa ctttccaact   1800
gttggtctgt ttgacggtaa cttcagacaa aatttggaag agactggaat gggttatggc    1860
ttggaggttg agatgattgc agcagctcac aggatgggcc ttttgacaac cccatatgct    1920
ttctgcccag atgaagcagt tgctatggca gaagctggtg ccgacatcat agttgctcat   1980
atggggctta caacatctgg ttcaattggt gcaaaaacag ccgtctcatt ggaggaaagt   2040
gtaacttgcg ttcaagctat tgcagatgct actcatagga tatatcctga tgcaattgtg   2100
ctctgccatg gaggccctat atcttcccct gaagaagcag catatgtact gaagagaacc   2160
acaggagttc atggatttta tggcgcttca agcatggaaa gactaccagt tgagcaagct   2220
ataactgcaa ctgtccagca gtacaagtct atatctatgg agtga                   2265
```

<210> SEQ ID NO 23
<211> LENGTH: 60
<212> TYPE: DNA
<213> ORGANISM: Solanum lycopersicum

<400> SEQUENCE: 23

```
tatttgtggg attaacaatg ttagtaaggt tgttctatct aatgcgggtg cagcatttgc       60
```

<210> SEQ ID NO 24
<211> LENGTH: 60
<212> TYPE: DNA
<213> ORGANISM: Solanum lycopersicum

<400> SEQUENCE: 24
tatttgtggg attaacaatg tcagtaaggt tgttctatct aatgcgggtg cagcatttgc    60

<210> SEQ ID NO 25
<211> LENGTH: 60
<212> TYPE: DNA
<213> ORGANISM: Solanum lycopersicum

<400> SEQUENCE: 25
tatttgtggg attaacaatg tyagtaaggt trttctatct aatgcgggtg cagcatttgc    60

<210> SEQ ID NO 26
<211> LENGTH: 754
<212> TYPE: PRT
<213> ORGANISM: Solanum lycopersicum

<400> SEQUENCE: 26

```
Met Ala Thr Ala Gln Ser Asn Ser Pro Arg Val Phe Cys Ile Gly Thr
1               5                   10                  15

Ala Asp Thr Lys Phe Asp Glu Leu Arg Phe Leu Ser Glu His Val Arg
            20                  25                  30

Ser Ser Leu Asn Ser Phe Ser Asn Lys Ser Ser Phe Lys Val Gly Val
        35                  40                  45

Thr Val Val Asp Val Ser Thr Ser Arg Lys Glu Thr Asn Ser Cys Ala
    50                  55                  60

Asp Phe Asp Phe Val Pro Ser Lys Asp Val Leu Ser Cys Tyr Ala Arg
65                  70                  75                  80

Gly Glu Gly Thr Val Gly Arg Phe Pro Asp Ile Arg Gly Gln Ala Ile
                85                  90                  95

Ala Ile Met Asn Lys Ala Leu Glu Thr Phe Leu Ser Lys Ala Asn Gly
            100                 105                 110

Glu Gln Asn Leu Ala Gly Val Ile Gly Leu Gly Gly Ser Gly Gly Thr
        115                 120                 125

Ser Leu Leu Ser Ser Ala Phe Arg Ser Leu Pro Ile Gly Ile Pro Lys
    130                 135                 140

Val Ile Ile Ser Thr Val Ala Ser Gly Gln Thr Glu Ser Tyr Ile Gly
145                 150                 155                 160

Thr Ser Asp Leu Val Leu Phe Pro Ser Val Asp Ile Cys Gly Ile
                165                 170                 175

Asn Asn Val Ser Lys Val Val Leu Ser Asn Ala Gly Ala Ala Phe Ala
            180                 185                 190

Gly Met Val Ile Gly Arg Leu Glu Ser Ser Lys Glu His Ser Ile Thr
        195                 200                 205

Asn Gly Lys Phe Thr Val Gly Val Thr Met Phe Gly Val Thr Thr Pro
    210                 215                 220

Cys Val Asn Ala Val Lys Glu Arg Leu Val Lys Glu Gly Tyr Glu Thr
225                 230                 235                 240

Leu Val Phe His Ala Thr Gly Val Gly Gly Arg Ala Met Glu Asp Leu
                245                 250                 255

Val Arg Gly Gly Phe Ile Gln Gly Val Leu Asp Ile Thr Thr Thr Glu
            260                 265                 270

Val Ala Asp Tyr Val Val Gly Val Met Ala Cys Asp Ser Ser Arg
        275                 280                 285

Phe Asp Ala Ile Leu Glu Lys Lys Ile Pro Leu Val Leu Ser Val Gly
    290                 295                 300
```

```
Ala Leu Asp Met Val Asn Phe Gly Pro Lys Thr Ile Pro Pro Glu
305                 310                 315                 320

Phe Gln Gln Arg Lys Ile His Gln His Asn Glu Gln Val Ser Leu Met
            325                 330                 335

His Thr Thr Val Gly Glu Asn Lys Lys Phe Ala Ala Phe Ile Ala Glu
                340                 345                 350

Lys Leu Asn Lys Ala Ser Ser Val Cys Val Cys Leu Pro Glu Lys
            355                 360                 365

Gly Val Ser Ala Leu Asp Ala Pro Gly Lys Asp Phe Tyr Asp Pro Glu
    370                 375                 380

Ala Thr Ser Cys Leu Thr His Glu Leu Gln Met Leu Leu Glu Asn Asn
385                 390                 395                 400

Glu Arg Cys Gln Val Lys Val Tyr Pro Tyr His Ile Asn Asp Val Glu
            405                 410                 415

Phe Ala Asn Ala Leu Val Asp Ser Phe Leu Glu Met Ser Pro Lys Ser
                420                 425                 430

Gly His Val Glu Cys Gln Thr Ala Glu Ser Lys Ser Ile Gln Gly Ile
            435                 440                 445

Gln Asn Val Asn Ala Val Leu Glu Lys Tyr Pro Ser Cys Asn Gly Lys
450                 455                 460

Asn Phe Ser Arg Leu Asn Asp Phe Pro Asn Ala Lys Pro Glu Thr Leu
465                 470                 475                 480

Gln Lys Arg Ile Val Ile Leu Gln Lys Leu Lys Asp Gln Ile Ser Lys
                485                 490                 495

Gly Lys Pro Ile Ile Gly Ala Gly Ala Gly Thr Gly Ile Ser Ala Lys
            500                 505                 510

Phe Glu Glu Ala Gly Gly Val Asp Leu Ile Val Leu Tyr Asn Ser Gly
    515                 520                 525

Arg Phe Arg Met Ala Gly Arg Gly Ser Leu Ala Gly Leu Leu Pro Phe
    530                 535                 540

Ala Asp Ala Asn Ala Ile Val Leu Glu Met Ala Asn Glu Val Leu Pro
545                 550                 555                 560

Val Val Lys Glu Val Ala Val Leu Ala Gly Val Cys Ala Thr Asp Pro
            565                 570                 575

Phe Arg Arg Met Asp Asn Phe Leu Lys Gln Leu Glu Ser Val Gly Phe
                580                 585                 590

Cys Gly Val Gln Asn Phe Pro Thr Val Gly Leu Phe Asp Gly Asn Phe
            595                 600                 605

Arg Gln Asn Leu Glu Glu Thr Gly Met Gly Tyr Gly Leu Glu Val Glu
    610                 615                 620

Met Ile Ala Thr Ala His Arg Met Gly Leu Leu Thr Thr Pro Tyr Ala
625                 630                 635                 640

Phe Cys Pro Asp Glu Ala Val Ala Met Ala Glu Ala Gly Ala Asp Ile
            645                 650                 655

Ile Val Ala His Met Gly Leu Thr Thr Ser Gly Ser Ile Gly Ala Lys
                660                 665                 670

Thr Ala Val Ser Leu Glu Glu Ser Val Thr Cys Val Gln Ala Ile Ala
            675                 680                 685

Asp Ala Thr His Arg Ile Asn Pro Asp Ala Ile Val Leu Cys His Gly
    690                 695                 700

Gly Pro Ile Ser Ser Pro Glu Glu Ala Ala Tyr Val Leu Lys Arg Thr
705                 710                 715                 720

Thr Gly Val His Gly Phe Tyr Gly Ala Ser Ser Met Glu Arg Leu Pro
```

-continued

```
                725                 730                 735
Val Glu Gln Ala Ile Thr Ala Thr Val Gln Gln Tyr Lys Ser Ile Ser
            740                 745                 750
Met Glu
```